United States Patent [19]

Ono et al.

[11] Patent Number: 4,843,292
[45] Date of Patent: Jun. 27, 1989

[54] DIRECT DRIVE MOTOR SYSTEM

[75] Inventors: Yutaka Ono; Yayoi Tsuchiya; Yutaka Koizumi; Hitoshi Morimoto; Hideo Banzai; Yasuhiko Muramatsu; Syotoro Shindo; Toshihiro Kanehara; Norihiko Hatano; Susumu Ohta; Mitsuhiro Nikaido, all of Tokyo, Japan

[73] Assignee: Yokogawa Electric Corporation, Tokyo, Japan

[21] Appl. No.: 160,557

[22] Filed: Feb. 25, 1999

[30] Foreign Application Priority Data

| Mar. 2, 1987 | [JP] | Japan | 62-47151 |
| Mar. 2, 1987 | [JP] | Japan | 62-47152 |
| Mar. 2, 1987 | [JP] | Japan | 62-47153 |
| Mar. 2, 1987 | [JP] | Japan | 62-47154 |
| Mar. 2, 1987 | [JP] | Japan | 62-47155 |
| Nov. 26, 1987 | [JP] | Japan | 62-298354 |

[51] Int. Cl.$^4$ .............................................. G05B 1/01
[52] U.S. Cl. .................................. 318/606; 318/808; 318/661; 318/640; 318/607
[58] Field of Search ............... 318/806, 808, 811, 812, 318/800, 803, 611, 561, 567, 645, 568, 599, 640, 661, 603, 607, 606

[56] References Cited

U.S. PATENT DOCUMENTS

| 4,357,569 | 11/1982 | Iwakane et al. | 318/661 |
| 4,358,722 | 11/1982 | Iwakane et al. | 318/661 |
| 4,371,824 | 2/1983 | Gritter | 318/681 X |
| 4,456,865 | 6/1984 | Robertson et al. | 318/810 X |
| 4,641,069 | 2/1987 | Fujioka et al. | 318/798 X |

Primary Examiner—Benjamin Dobeck
Attorney, Agent, or Firm—Moonray Kojima

[57] ABSTRACT

A direct drive motor system for controlling driving of the joints of a multi-jointed robot, comprising a motor portion, a rotation detecting portion, a position control portion, a speed control portion, a driving circuit and a tuning portion, wherein the motor portion is of an inductor type, the rotation detection portion uses an optical rotary encoder or magnetic resolver, and the position control portion is arranged to control in a feedback manner the rotational position of the motor with a tertiary servo system with software. The system's driving circuit has a feedback control loop for the current of the motor coil, and a detection circuit for the current includes a small signal isolator. The tuning portion tunes the servo systems of the speed control portion and the position control portion. As a result, the system simultaneously satisfies various requirements of such a direct drive motor.

16 Claims, 16 Drawing Sheets

| J | $f_n$ | Control Parameter | | | |
|---|---|---|---|---|---|
| $J_1$ | $f_{n1}$ | $x_{11}$ | $x_{12}$ | $x_{13}$ | ---- |
| $J_2$ | $f_{n2}$ | $x_{21}$ | $x_{22}$ | $x_{23}$ | ---- |
| | | | | | |

DIRECT DRIVE MOTOR SYSTEM

BACKGROUND OF THE INVENTION

1. Field of Invention

This invention relates to direct drive motor systems for driving the joints of multi-joint robots.

2. Description of the Prior Art

In the prior art, the main type of drive system used for driving the joints of a multi-joint robot comprises a DC motor and a decelerator. In such a system, low speed and large torque are produced.

However, the ideal system for such use is one that uses a direct drive (abbreviated "D.D.") system utilizing a motor of the inductor type because of such properties as the life of the brushes, the decelerator of the D.C. motor, and the necessity for maintenance of lubrication oil.

A circuit for driving such a motor is known wherein an exciting current, passing through the coil of the motor, is detected by means of an electric current detecting circuit. Then, the difference between the detected current and a predetermined instructed current level is supplied to an electric amplifying circuit, wherein an exciting current is passed through the motor coil in such a manner that the differential signal becomes zero by means of a pulse width modulation signal (abbreviated PWM).

In this type of driving circuit, the current detecting circuit preferably has a high degree of accuracy and insulating capability and a simple structure.

A type of means for detecting the rotation of such a motor is known in which an optical rotary encoder or a magnetic resolver is used. The means for detecting the rotation of the motor is preferably capable of detecting, at high resolution, the rotational position, rotational speed and position of the magnetic poles of the motor. Furthermore, the means for detecting the rotation of the motor is preferably capable of detecting easily the original point of the rotational position.

As a circuit for controlling the rotation of the motor, a device is known wherein the rotational speed of the motor and the rotated position are controlled in a feedback manner in response to a detection signal from the rotation detecting means. A control circuit of the type described above is preferably capable of adjusting the servo systems in accordance with the conditions for use of the motor, for example, the characteristic frequency of the motor or load inertia.

As a device for stopping the motor, one type is know wherein the coil of the motor is separated from the driving circuit when the motor is stopped so as to generate a short circuit, whereby the motor is stopped by the resistance of the coil consuming kinetic energy due to Joule's effect. When the motor rotates at a high rotational speed, the phase difference (abbreviated as "phase $\phi$") between the exciting current and the exciting voltage becomes large due to the inductance of the coil. Thus, the kinetic energy cannot be consumed efficiently. The motor which is used for driving the joints of the robot is stopped at a variety of rotational speed ranges. Thus, the above described stopper device is not suitable for such use.

It is known to use rectangular slits in an optical encoder as the rotational detecting means However, since such a rectangular slit creates a spatial distribution of the passing light in the form of a rectangular shape, means for detecting the passing light receives the rectangular distributed light. Thus, the detection signal includes in principle higher harmonics. If the detection signal is used for controlling the motor, ripples are included in the position and speed signals. As a result, the motor cannot rotate smoothly The direct drive motor system needs to satisfy many factors. The prior art does not have any system which can simultaneously satisfy all of the above desired properties.

SUMMARY OF THE INVENTION

Accordingly, an object of the invention is to overcome the aforementioned and other deficiencies and disadvantages of the prior art.

Another object is to provide a D.D. motor system which can simultaneously satisfy all of the above desired properties and requirements.

The foregoing and other object and advantages are attained by the invention which encompasses a DD motor system comprising a motor portion, a rotation detecting portion, a position control portion, a speed control portion, a driving circuit portion and a tuning portion. The motor portion comprises an inductor type motor, while the rotation detecting portion uses an optical encoder or a magnetic resolver. The position control portion controls the rotational position of the motor in a feedback manner by means of a tertiary servo system with software. The driving circuit portion includes a feedback control loop for the current of the motor coil, and the detecting circuit for this current includes a small signal isolator. The tuning portion is arranged to tune the servo systems of the position control portion and the speed control portion.

Advantageously, the invetion simultaneously satisfies the aforementioned and other properties and requirements for a direct drive motor system.

3

Figure 19:
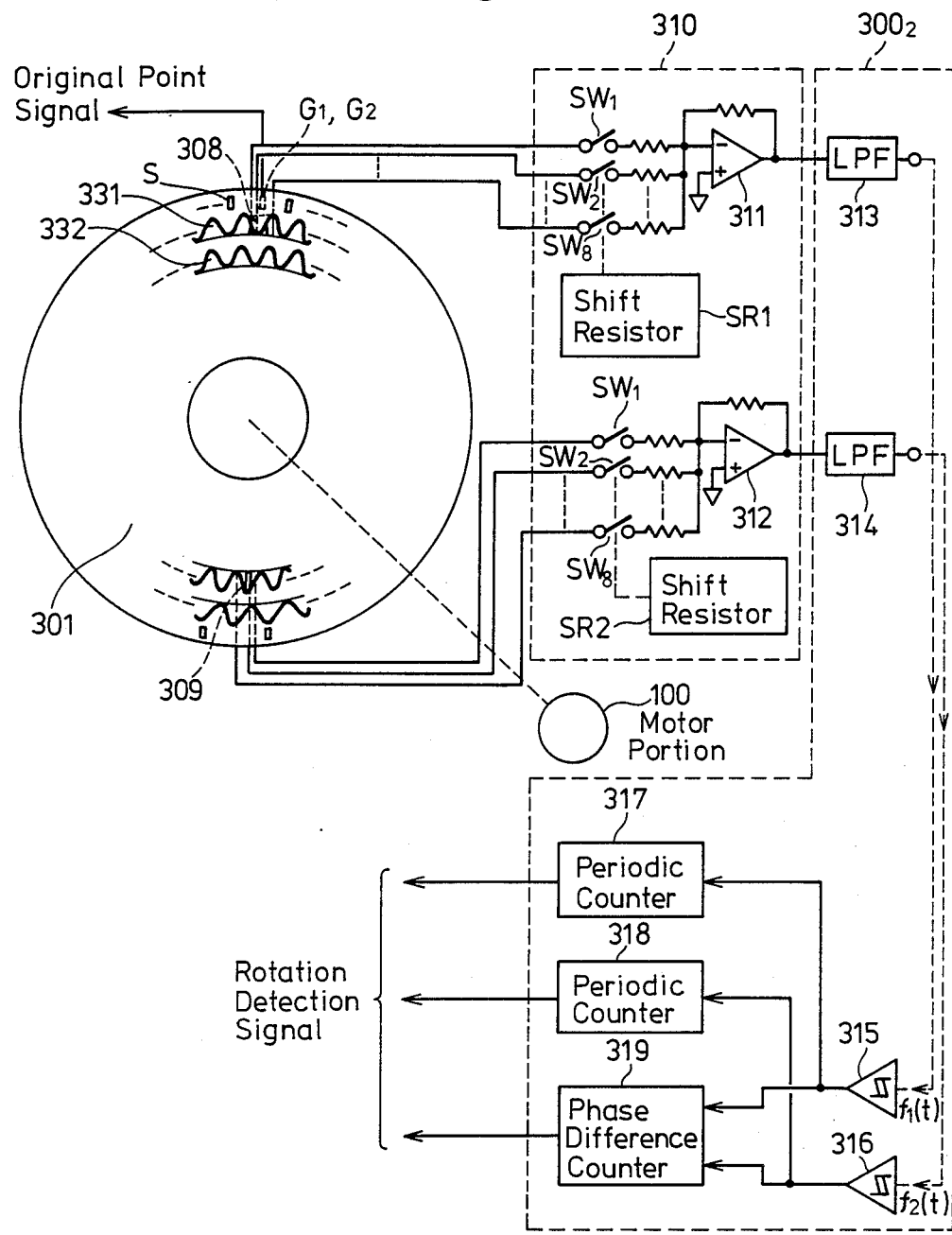

FIG. 19 is a schematic view depicting another example of the structure of the rotation detecting portion used in the invention.

Figure 20:
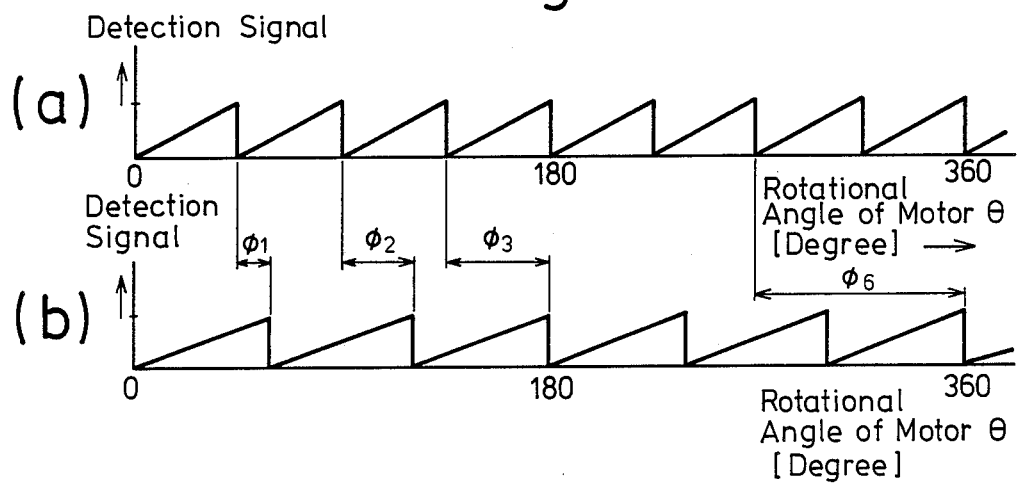

FIG. 20, lines (A) and (B), are wave diagrams depicting operation of the circuit depicted in FIG. 19.

Figure 21:
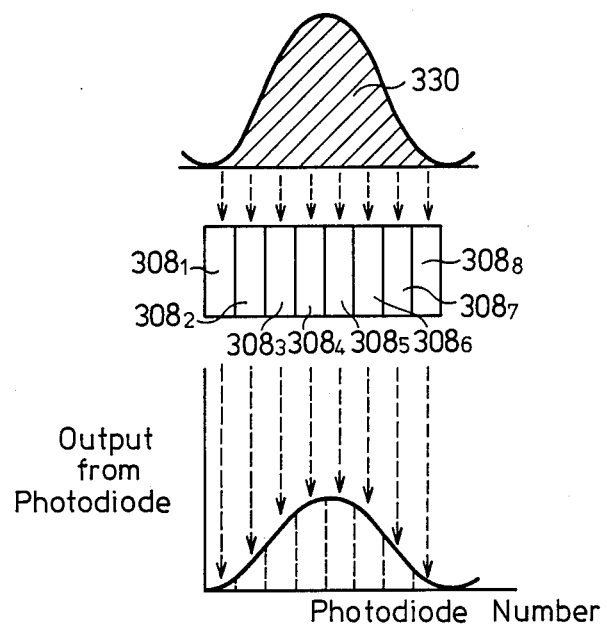

FIG. 21 is a diagram depicting a waveform of an output signal from an encoder havin sine wave formed slits.

FIGS. 22(A) and 22(B) are views depicting another example of the structure of the rotation detecting portion used in the invention.

Figure 22:
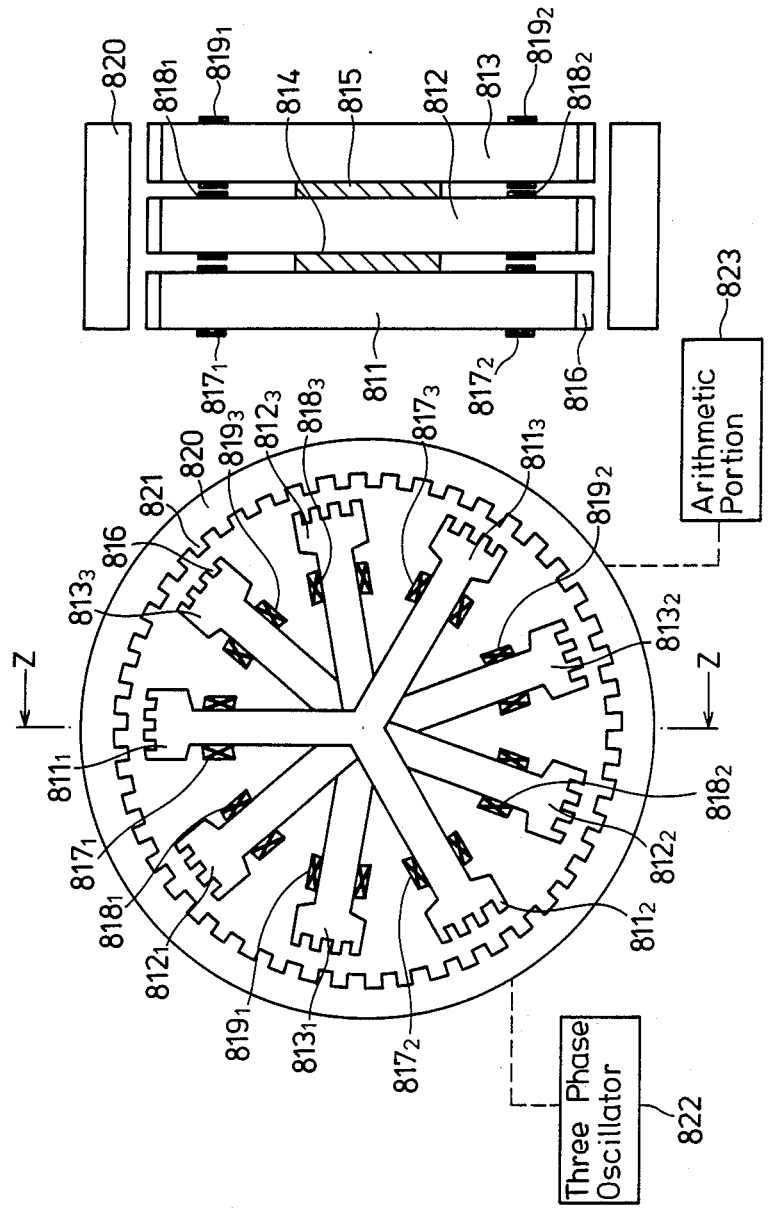
Figure 23:
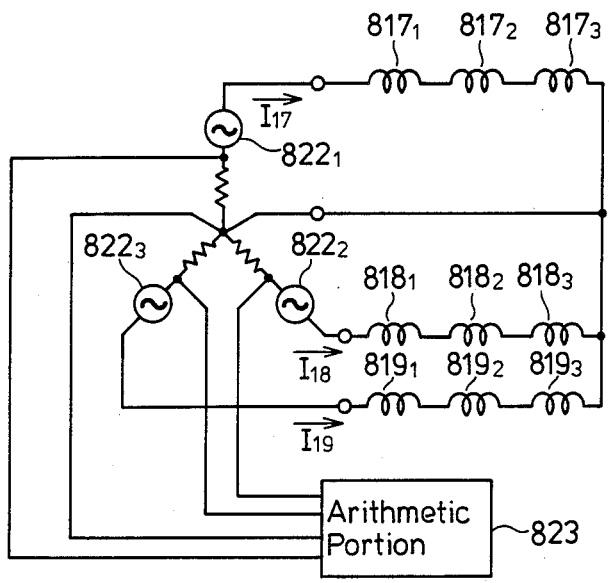

FIG. 23 is a circuit diagram depicting the device of FIG. 22.

Figure 24:
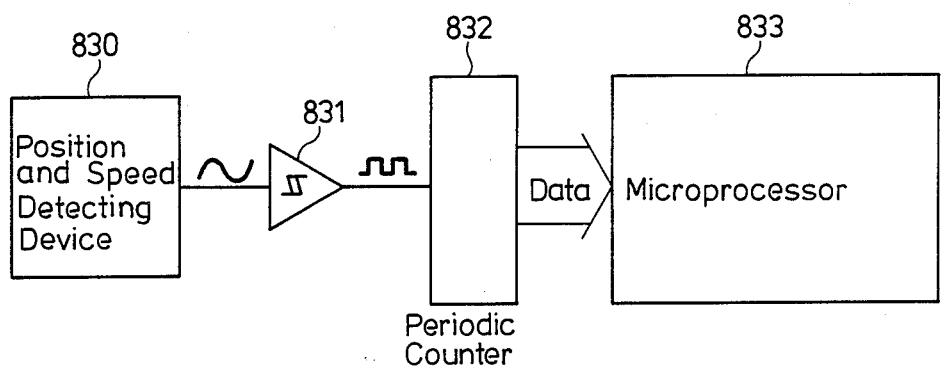

FIG. 24 is a schematic view depicting an example of the structure of a counter circuit which uses the device of FIG. 22.

Figures 25A, 25B:
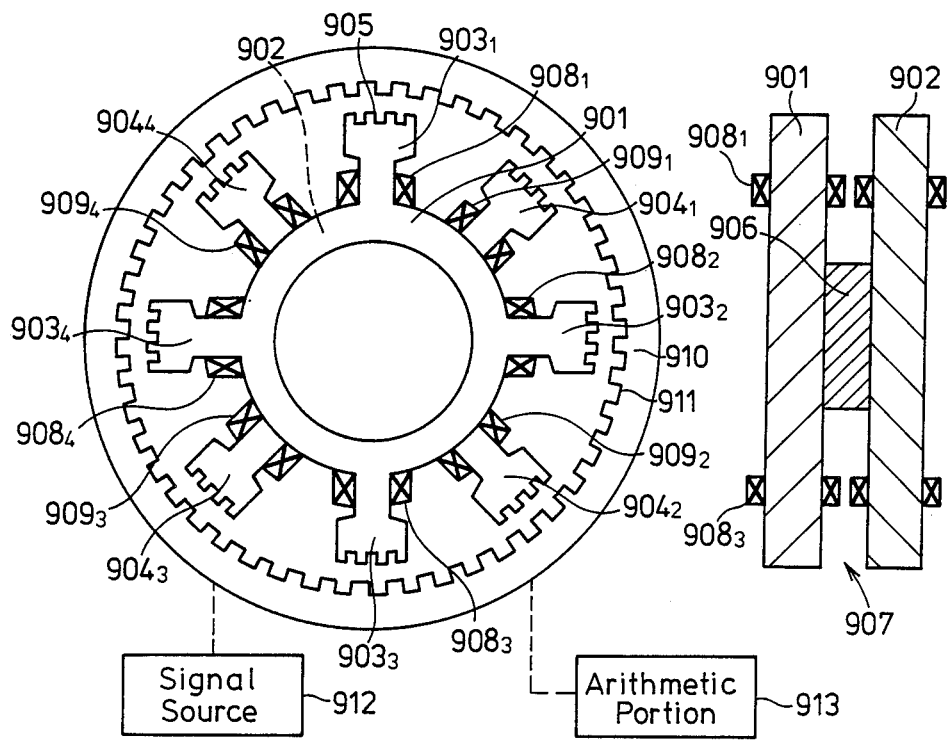

FIGS. 25(A) and 25(B) are views depicting another example of the structure of the rotation detecting portion used in the invention.

Figure 26:
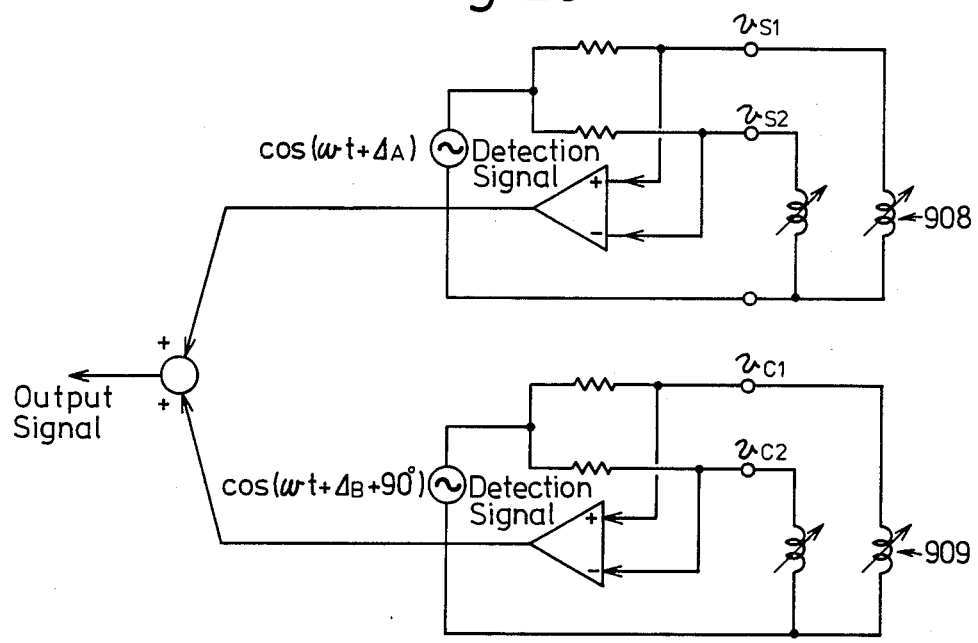
Figure 27:
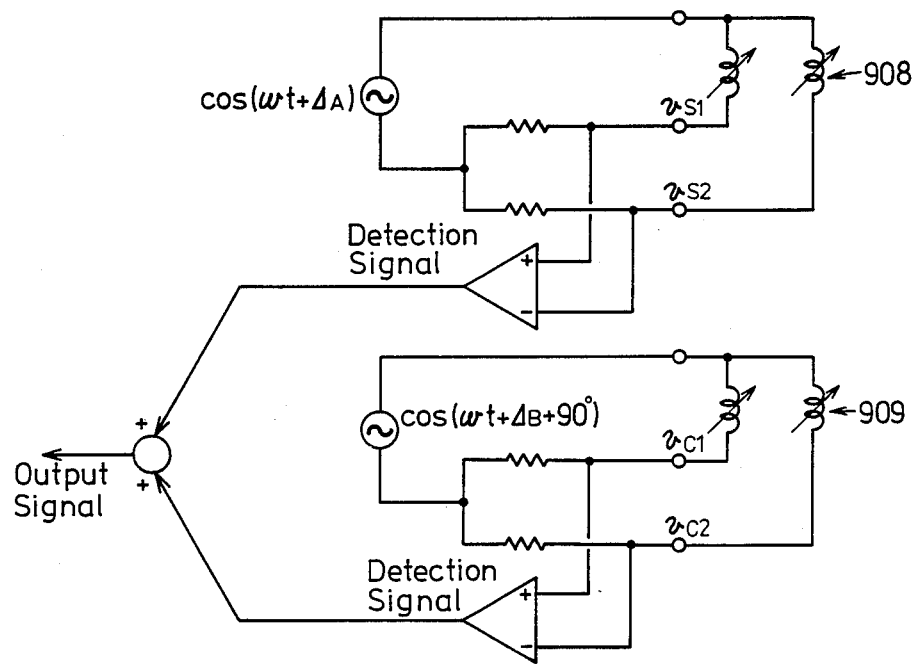
Figure 28:
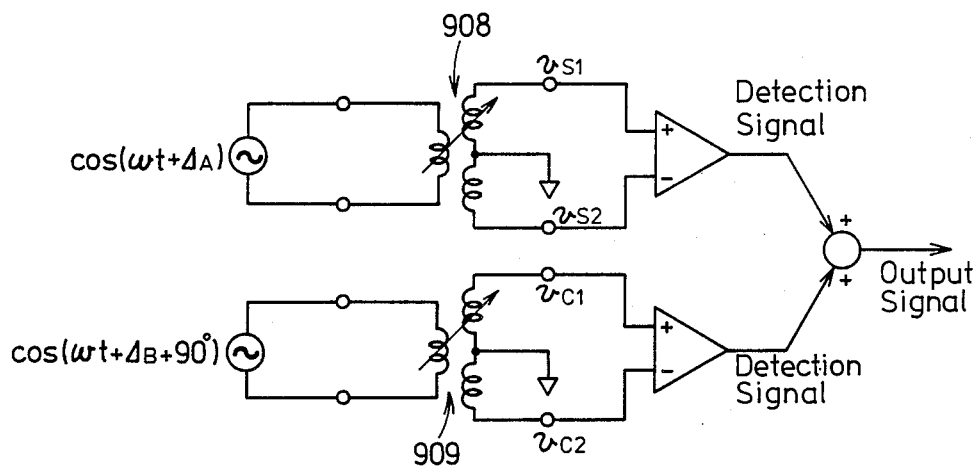

FIGS. 26, 27, 28 are schematic views depicting examples of the detecting circuit used inthe rotation detecting portion of FIG. 25.

DESCRIPTION OF THE PREFERRED EMBODIMENTS.

Figure 1:
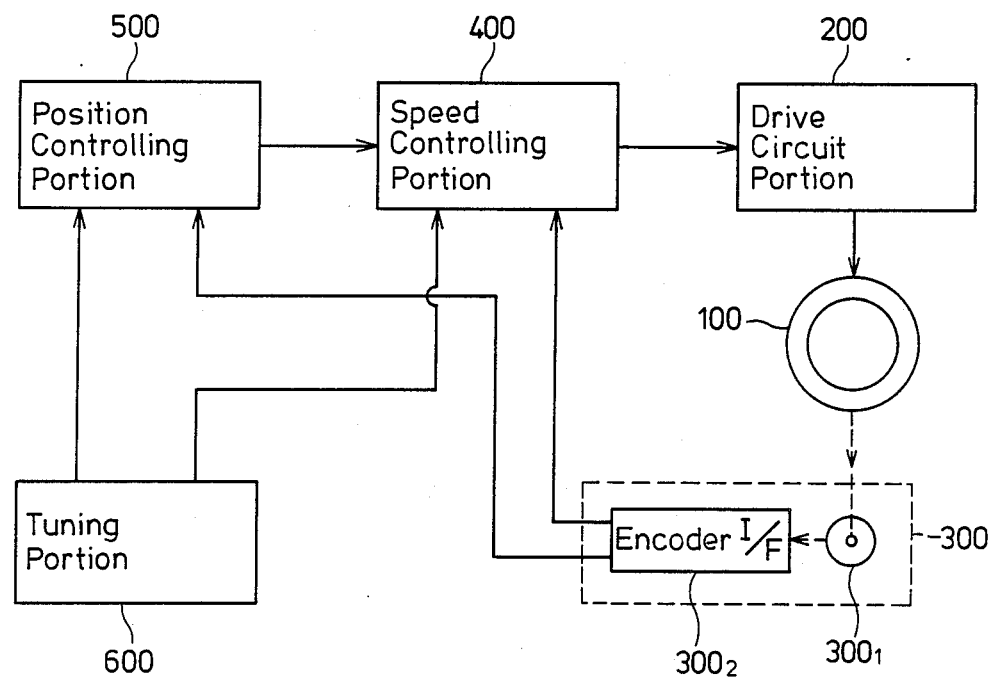
FIG. 1 is a schematic view depicting an illustrative embodiment of the invention.

Referring to FIG. 1, the D.D. motor system of the invention comprises a motor portion 100; a driving circuit 200 for rotating motor portion 100; a rotation detecting portion 300 for detecting the rotation of motor portion 100; speed control portion 400 for feedback controlling the rotational speed of motor portion 100; a position control portion 500 for feedback controlling the rotational position of motor portion 100; and a tuning portion 600 for adjusting the servo systems of speed control portion 400 and position control portion 500. Rotation detecting portion 300 comprises, for example, an encoder $300_1$ and an encoder interface (abbreviated as "encoder I/F") $300_2$.

Figure 2:
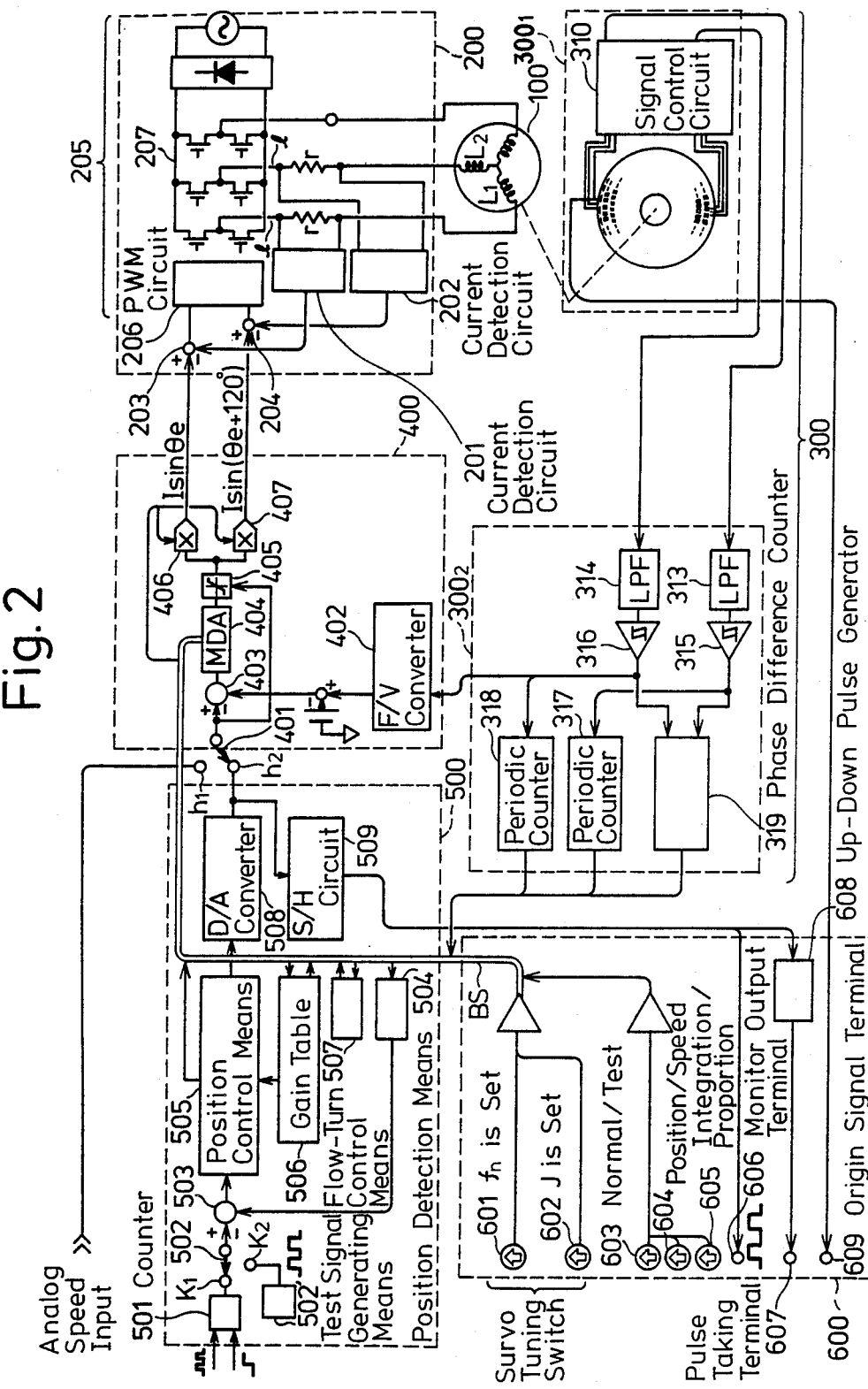
FIG. 2 is a schmatic view depicting details of the embodiment of FIG. 1.

Details of the above components of the system are shown in FIG. 2, wherein the same numbers are attached to the same components. In FIG. 2, motor portion 100 comprises a motor of the three phase inductor type wherein a rotor is disposed on the outside thereof, while a stator is disposed on the inside thereof.

Figure 3B:
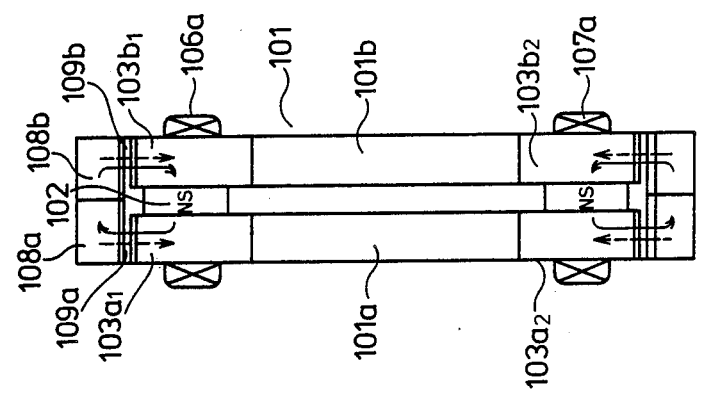
FIGS. 3(A) and 3(B are views depicting an example of the structure of the motor portion.
Figure 3A:
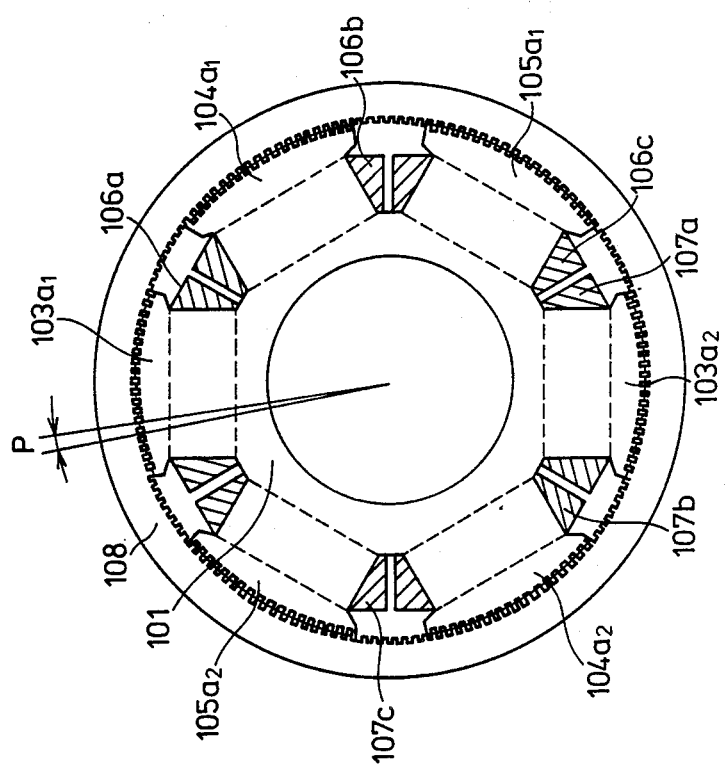

Details of the motor portion 100 are shown in FIGS. 3(A) and 3(B) wherein FIG. 3(A) is a front elevational view of the motor portion 100 and FIG. 3(B) is a cross-sectional view of the motor portion 100. In order the make the radius of the rotor of the motor large, the rotor is disposed on the outside, while the stator is disposed on the inside. Furthermore, a static magnet is disposed on the stator side. The inside stator 101 comprises two magnetic parts 101a and 101b, a static magnet, which could be a permanent magnet or an electromagnet, 102, and an exciting coil 106,107 to be described later.

Each magnetic part 101a and 101b has six salient poles $103a_1$ to $105a_1$, $103a_2$ to $105a_2$, to $105a_2$ and $103b_1$ to $105b_1$, and $103b_2$ to $105b_2$, as shown. Each front end of the salient poles is provided with teeth having pitch P. The teeth on the neighboring salient poles, for example, the teeth on $103a_1$ and $104a_2$, are shifted by ⅓ pitch (i.e. P/3) with respect to each other. On the other hand, the salient ples opposing each other (e.g. magnetic parts 101a and 101b and salient pole $103a_1$ and salient pole $103b_1$) are arranged to be in the same phase. Exciting coils 106a to 106c and 107a to 107c are arranged so that pairs of them are connected in series, such as 106a and

4

107a, 106b and 107b, and 106c and 107c. A rotor 108 is made of a magnetic material having teeth of pitch P on the inside thereof, and comprises members 108a and 108b and the teeth thereof are shifted by ½ pitch (i.e. P/2).

Motor 100 rotates when the currents (e.g. sine wave, pulse wave or the like), the phases of which are shifted by 120° are passed through exciting coils 106a and 107a, 106b and 107b, 106c and 107c. The direction of rotation of motor 100 can be switched by changing the advance or delay of the phases of the currents. The flux generated by static magnet 102 and the flux generated by exciting coil 106a are added to or subtracted from each other at gaps 109a and 109b. As a result, the pulse motor rotates at high resolution. Since the flux generated by static magnet 102 satisfies half of the flux needed for rotating the pulse motor, electric consumption can be kept low, and efficiency is thereby substantially improved. The permanent magnet used as the static magnet is disposed on the stator side because the magnetic flux density at the surface of the magnet is small, that is, at most 1 T (tesla). Thus, a certain size is needed for the permanent magnet. But, if the permanent magnet is disposed on the rotor side, the thickness in the radial direction becomes large. The number of salient poles may be selected to be a multiple of three, other than six.

The motor 100 generates a significantly larger torque than a conventional motor of the same outer diameter and shaft diameter.

Referring again to FIG. 2, driving circuit 200 comprises current detecting circuits 201 and 202 for detecting the exciting currents which pass through coils $L_1$ and $L_2$ of the motor portion; subtractors 203, 204 for obtaining the difference between the current instruction value supplied from speed control portion 400 and detected currents from current detecting circuits 201 and 202; and electric amplifying circuit 205 which serves to turn ON or OFF a transistor of an exciting circuit 207 by supplying a PWM signal generated by a PWM circuit 206, the PWM signal being generated in response to signals from subtractors 203 and 204. As a result, a three phase sine wave current is passed throughthe motor in such a manner that the differential current between subtractors 203 and 204 becomes zero.

Figure 4:
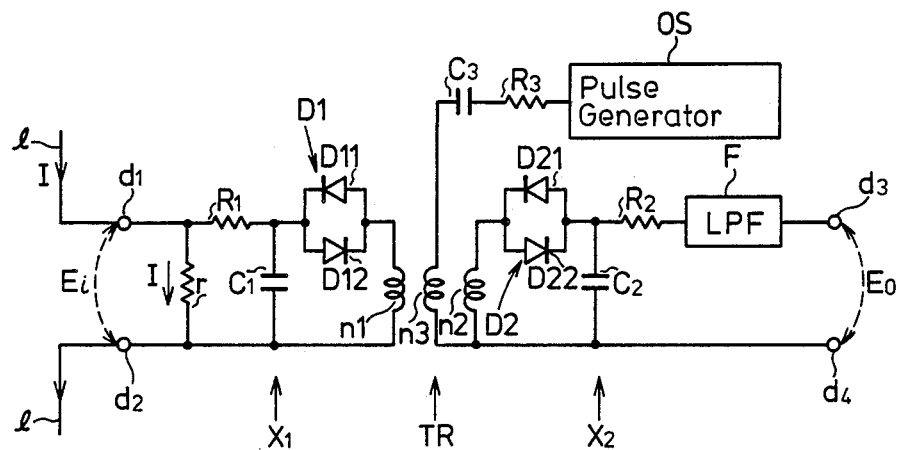
FIG. 4 is a schematic view depicting an example of the current detecting circuit of the driving circuit.

Details of current detecting circuits 201 and 202 are shown in FIG. 4, wherein symbol $X_1$ represents an input circuit, symbol $X_2$ represents an output circuit, and symbol TR represents a transformer. Transformer TR comprises a primary coil $n_1$ to which input circuit $X_1$ is connected; a secondary coil $n_2$ to which the output cirucit $X_2$ is connected; and a third coil $n_3$ which is disposed between primary coil $n_1$ and secondary coil $n_2$.

Input terminals $d_1$ and $d_2$ of input circuit $X_1$ are connected to a line 1 through which the exciting current shown in FIG. 2 passes. a resistor r is connected between input terminals $d_1$ and $d_2$. Exciting currents I from motor coils $L_1$ and $L_2$ pass through resistor r. A series circuit, formed by a resistor $R_1$ and a capacitor $C_1$, is connected to resistor r in a parallel manner. The magnitude of resistance of resistor r is, for example, 5 mΩ which is sufficiently small with respect to the magnitude of the resistance of resistor $R_1$. Furthermore, a series circuit, formed by a parallel diode circuit $D_1$ and primary coil $n_1$ is connected to capacitor $C_1$ in a parallel manner. The parallel diode circuit $D_1$ comprises diodes $D_{11}$ and $D_{12}$ which are connected in parallel with reversed polarities.

Output circuit $X_2$ has output terminals $d_3$ and $d_4$. A series circuit, formed by a low pass filter (abbreviated "LPF") F, a resistor $R_2$, and a capacitor $C_2$, is connected between output terminals $d_3$ and $d_4$. A series circuit, formed by a parallel diode circuit $D_2$ and coil $n_2$, is connected to two ends of capacitor $C_2$ which forms an averaging means. Parallel diode circuit $D_2$ is similar to parallel diode circuit $D_1$.

Figure 5:
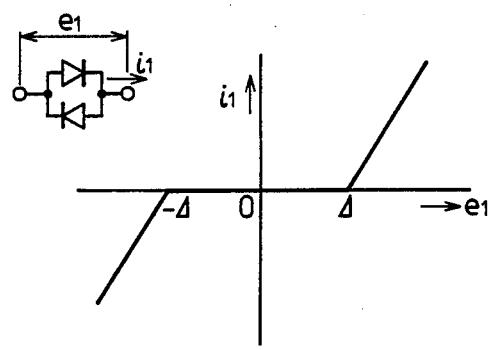
FIG. 5 a graph depicting operation of part of the circuit of FIG. 4.

As depicted is FIG. 5, the relationship between voltage $e_1$ and passing current $i_1$ which is applied to and passes through the parallel diode circuits $D_1$ and $D_2$, is non-linear.

A pulse generator OS is connected to coil $n_3$ through a resistor $R_3$ and a capacitor $C_3$.

Figure 6:
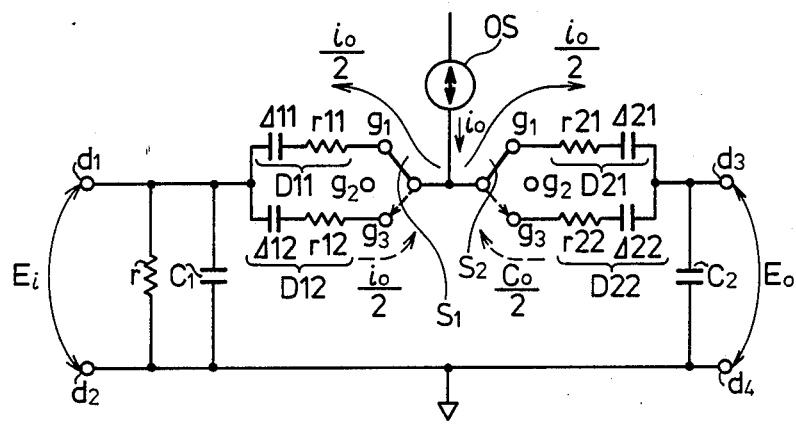
FIG. 6 is a schematic view of an equivalent circuit of a driving portion.

In the FIG. 4 circuit, when the proportion of the number of coils of primary coil $n_1$ and secondary coil $n_2$ of transformer TR is set at 1:1, and symmetrical positive and negative impulse signals are supplied to third coil $n_3$, the equivalent circuit of the resulting circuit is shown in FIG.6. In the equivalent circuit, input voltage $E_i$ becomes rI (resistance of resistor r is also represented by r). Switches $S_1$ and $S_2$ serve to switch diodes $D_{11}$, $D_{12}$, $D_{2l}$ and $D_{22}$. When a positive inpulse from pulse generator OS is applied to switches $S_1$ and $S_2$, they are connected to a contact $g_1$ side (diodes $D_{11}$ and $D_{2l}$ are conductive). On the other hand, when a negative inpulse is applied to switches $S_1$ and $S_2$, they are connected to a contact $g_3$ side (diodes $D_{12}$ and $D_{22}$ are conductive). Furthermore, when no inpulse is applied, switches $S_1$ and $S_2$ are connected to contact $g_2$ side (both of the diodes are not conductive). EAch of diodes $D_{11}$ to $D_{22}$ is expressed by a series connection of a forward voltage $\Delta$ and a kinetic resisaance (i.e. forward resistance). For example $D_{11}$ is expressed by a series connection of $\Delta 11$ and r 11.

When a positive inpulse $i_o$ is applied from pulse generator OS, switches $S_1$ and $S_2$ become the equivalent (diodes $D_{11}$ and $D_{21}$ are conductive) to the state where they are connected to contact g1. Therefore inpulse io passes to diode $D_{11}$ side and diode $D_{21}$ in such a manner that equal magnitude of $i_o/2$ passes to the above two sides. In this state, an output voltage $E_{o1}$ between output terminals $d_3$ and $d_4$ is expressed as follows:

$$E_{o1} = Ei + \Delta_{11} + \frac{i}{2}(r_{11} - r_{21}) - \Delta_{21} \qquad (1)$$

Furthermore, when negative inpulse io (the amplitude is assumed to be the same as the case of a positive inpulse) is applied, an output voltage $E_{o2}$ between output terminals $d_3$ and $d_4$ is expressed as follows.

$$E_{o2} = Ei - \Delta_{12} - \frac{i_o}{2}(r_{12} - r_{22}) + \Delta_{22} \qquad (2)$$

Figure 7A:
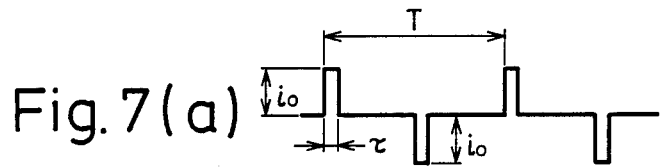
FIGS. 7(A) and 7(B), and 7(C) are wave diagrams to illustrate operation of the circuit of FIGS. 4.and 6.

By applying the positive and negative inpulses from pulse generator OS, as shown in FIG. 7(A), at a repetition period of T, and making the capacitances of capacitors $C_1$ and $C_2$ sufficiently large so as to make the change in potential due to charge or discharge of the inpulses small, output voltage $E_o$ becomes a mean of $E_{o1}$ and $E_{o2}$ as follows $$\begin{aligned} E_o &= \frac{E_{o1} + E_{o2}}{2} \\ &= Ei + \frac{1}{2}(\Delta_{11} - \Delta_{12} - \Delta_{21} + \Delta_{22}) + \\ &\quad \frac{i_o}{4}(r_{11} - r_{21} - r_{21} + r_{22}) \end{aligned} \qquad (3)$$

In equation (3), if $$\Delta_{11} = \Delta_{12}; \Delta_{21} = \Delta_{22} \qquad (4)$$
$$r_{11} = r_{12}; r_{21} = r_{22}$$

then both the second and third terms become zero, that is, output voltage $E_o$ and input voltage Ei become the same. Thus, voltage Ei supplied to the input circuit can be obtained from the output circuit side in an electrically insulating manner.

The conditions shown in Equation (4) can be easily achieved by using the same standardized part for devices $D_{11}$ and $D_{12}$, and for devices $D_{21}$ and $D_{22}$ which form the parallel diode circuits, or by maintaining a certain temperature.

Figure 7B:
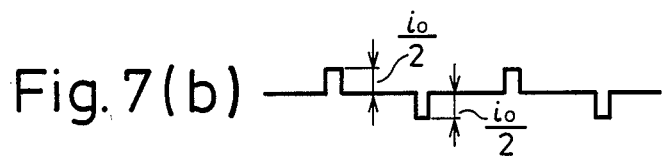
Figure 7C:
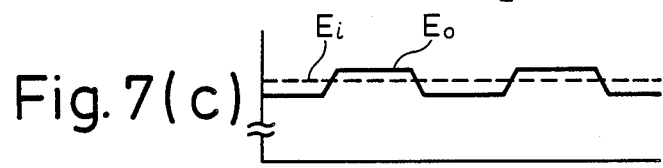

FIGS. 7(A), 7(B) and 7(C) illustrate waveforms generated when the circuit shown in FIG. 6 is actuated, wherein FIG. 7(A) depicts inpulses of positive and negative polarities; FIG. 7(B) depicts the currents divided into the $D_1$ side and $D_2$ side of the parallel diode circuit; and FIG. 7(C) depicts an output voltage in which the magnitude corresponding to the ripple of output voltage Eo is shown slightly exaggerated.

Figure 8:
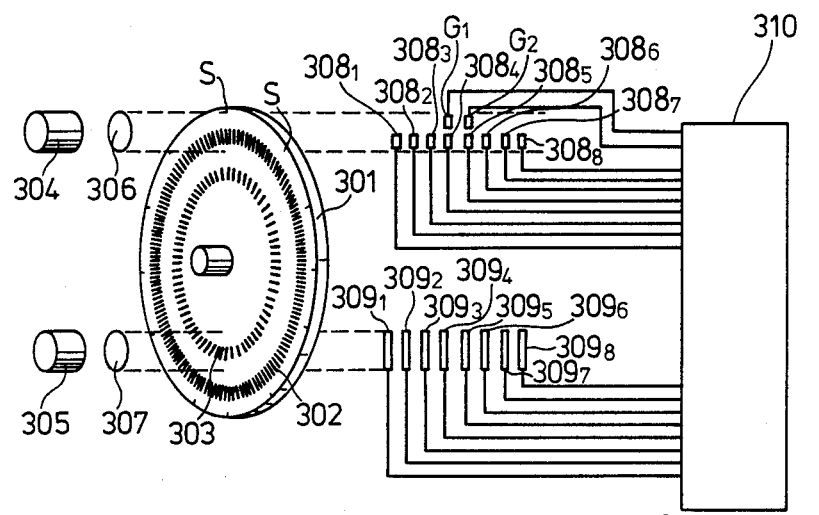
FIGS. 8, 9 and 10 are diagrams depicting the structure of the rotation detecting portion.

Referring again to FIG. 2, rotation detecting portion 300 comprises an encoder $300_1$, the details of which are depicted in FIG. 8 wherein an annular code plate 30 has light penetrating slits formed in two concentric circles of different radius, each of the slits being disposed at a predetermined pitch. The outer slit configuration comprises $m_1$ light penetrating slits 302, while the inner light penetrating slit configuration comprises $m_2$ light penetrating slits 303. Light penetrating slit configuration 302 and 303 are provided for the purpose of detecting the shift of the teeth provided for rotor 108 and stator 101. Slits S are provided for detecting the original point at positions which are at a greater radial distance than the slit configuration 302, whereby the rotational position of code plate 1 can be detected. Code plate 301 is arranged to rotate together with the oupuut shaft of the motor.

The encoder $300_1$ further comprises light sources 304, 305, and lenses 306, 307 for converting the light beams from sources 304 and 305 into parallel beams. Light passed through lens 306 reaches slits 302 and slits S, while light passed through lense 307 reaches slits 303.

Image sensor 308 receives the light, as slit images, passed through light penetrating slits 302, and comprises, for example, eight photodiodes $308_1$ to $308_8$ which are disposed in an array configuration. Photodiodes $G_1$ and $G_2$ detect the light beams passed through light penetrating slits S.

An image sensor 309 receives the light, as slit images, passed through light penetrating slits 303, and comprises, for example, eight array arranged photodiodes $309_1$ to $309_8$.

Figure 9:
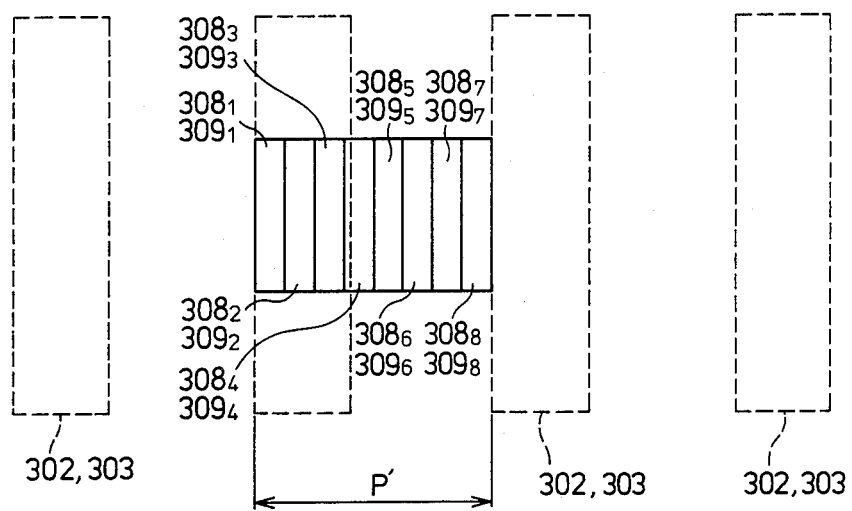

As shown in FIG. 9, photodiodes $308_1$ to $308_8$ and $309_1$ to $309_8$ arranged within one pitch P' formed by two slits.

Figures 10, 11:
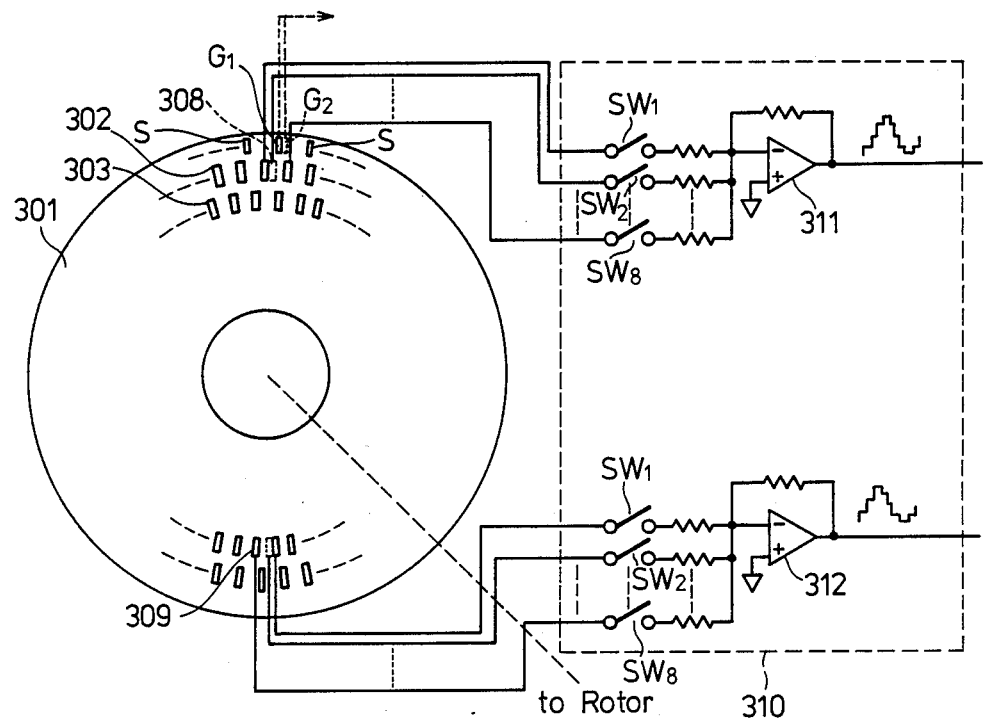
FIG. 11 is a table depicting a gain table stored in the position control portion.

A signal processing circuit 310 calculates the positional relationship between rotor 108 and stator 101 in response to detection signals from photodiodes $308_1$ to $308_8$ and from $309_1$ to $309_8$. Details of the signal processing circuit 310 are shown in FIG. 10, wherein switches SW1–SW8 successively obtain signals from the corresponding diodes $308_1$ to $308_8$ and $309_1$ to $309_8$ at a predetermined timing. OP amplifiers 311,312 amplify signals which are applied thereto through the corresponding switches SW1 to SW8. The outputs from OP amplifiers 311 and 312 form a waveform in a step like shape. Each height of the waves is determined in accordance with the number of photodiodes which have detected the light.

Referring again to FIG. 2, interface encoder I/F $300_2$ comprises LPF circuits 313 and 314 which extract low frquency components of the outputs from OP amplifiers 311 and 312. Comparators 315 and 316 shape the waveforms of the outputs from LPF circuits 313 and 314. Period counters 317 and 318 count the period of the waveforms of the outputs from comparators 135 and 316. A phase difference counter 319 counts the phase difference between the output waveforms from compar ators 315 and 316.

Turning again to FIG. 2, speed control portion 400 comprises a switch 401 for switching the speed control mode and the position control mode. Switch 401 is turned to contact $h_1$ when speed control is performed, and to contact $h_2$ when position control is performed. An F/V converter 402 converts the output signal from interface encoder I/F $300_2$ to a speed signal. A subtractor 403 subtracts between a signal, which serves as an intruction value on speed, from switch 401 and a signal from F/V converter 402. A multiplying digital to analog converter 404 (abbreviated "MDA") converts the gain in response to a digital signal whereby analog input signals are amplified. A signal for setting the gain is supplied from the position control portion 500 or the tuning portion 600.

A voltage control limiter 405 (abbreviated "VCL") limits the output from MDA 404 to a predetermined upper limit or a predetermined lower limit. MDA circuit 406,407 receive a signal from VCL 405 and supplies a current signal $I \sin \theta e$ or $I \sin (\theta e + 120°)$ as a current instruction value to subtractors 203 and 204 in response to the commutation control signal from the position control portion 500, wherein symbol I represents current.

In FIG. 2, position control portion 500 comprises a counter 501 for generating a position instruction signal in response to a position instruction pulses signal and a rotational direction signal. A switch 502 connects to a contact $k_1$ in a normal mode, and connects to contact $k_2$ in a test mode to which a test signal is supplied by a test signal generating means 502'. A subtractor 503 obtains the difference between a signal, which serves as a position instruction signal, from switch 502 and a signal from position detecting means 504. Position control means 505 adjusts the gain of MDA 404 based on a parameter read from gain table 506 in response to a signal from tuning portion 600. Position control means forms a tertiary servo system for performing IPD, i.e. integration, proportion, and differentiation, by use of software As shown in FIG. 11, gain table 506 comprises a table in which load intertia J of the motor, characteristic frequency fn of the position control system, and the most suitable control parameter vlaues $X_{11}$, $X_{12}$, $X_{13}$ corresponding to load inertia J and characteristic frequency fn are shown in tabular manner. Gain table 506 comprises a speed controlling table and a position controlling table, and each of which comprises a P-operating table and an I-operating table, for the proportion and integration factors The position control portion 500 of FIG. 2 further comprises commutation control means 507 for controlling commutation of the motor by applying signals to multipliers 406 and 407 in response to a signal from the interface encoder IF $300_1$. A digital to analog converter 508 for converting in an digital to analog manner the output from position control means 505, is provided A sample and hold circuit (abbreviated "S/H") 509 samples and holds an output from the digital to analog converter 508 and supplies it to tuning portion 600.

When speed control is performed, switch 401 is turned to contact $h_1$, whereby the difference between an analog speed input, as a speed instruction value, and a speed signal from F/V converter 402,is obtained by subtractor 403. The gain of MDA 404 is set by means of a control parameter value read out from gain table 506 by operating switches 601 and 602 as described hereinafter.

When the position control is performed, switch 401 is connected to contact $h_2$ and switch 502 is connected to contact $k_1$. The difference between the position instruction signal from counter 501 and the output signal from position detecting means 504 is obtained by subtractor 503. In the position control means 505, a control parameter is read out from gain table 506 by operating switches 601 and 602. The control parameter thus read out is used for adjusting the gain of MDA 404 in a position control algorithmic manner.

Turning again to FIG. 2, tuning portion 600 comprises servo tuning switches 601 and 602. Servo tuning switch 601 comprises a characteristic frequency setting switch for setting characteristic frequency fn in a plurality of steps within a predetermined range. The characteristic frequency is, for example, set into 16 steps in a range of 5 to 20 Hz by operating switch 601. Switch 602 is an interia setting switch for setting inertia J into a plurality of steps within a predetermined range. When fn and J are set by these switches 601 and 602, a most suitable control parameter value,which corresponds to the set values of fn and J, is read out from gain table 506. When position control is performed by operation of switches 601 and 602, position control means 505 adjusts the gain of MDA 404 depending upon the control parameter value read out from the position controlling table. When speed control is performed, the gain is adjusted by supplying the control parameter read from the speed control table to MDA 404.

Tuning portion 600 of FIG. 2 further comprises a switch 603 for turning ON and OFF switch 502; a switch 604 for turning ON and OFF switch 401; and a switch 605 for changing the speed control and position control to an integration mode or a proportion mode. An integration operation table and a proportion operation table of the gain table 506 is switched for use by operation of switch 605. In case a robot arm is operated by means of a D.D. motor, an integration operation mode control is performed for the purpose of positioning the robot arm, while a proportion operation mode control, i.e. compliance control, is performed for the purpose of holding an article.

The tuning portion 600 of FIG. 2 further comprises a monitor output terminal 606 for obtaining an output from position control portion 500 through sample and hold circuit 402. The output thus obtained is supplied to a display device, for example, an oscilloscope, for monitoring. A pulse taking terminal 607 obtains an incremental pulse signal through an up-down pulse generator 608. An original point signal terminal 609 obtains outputs from photodiodes $G_1$ and $G_2$. The outputs obtained from pulse taking terminal 607 and original point signal 609 are supplied to a controller (omitted from drawing). The rotational position of the motor is counted by means of the output from pulse taking terminal 607 in the controller, while an original position is detected by means of the output from original point signal terminal 609. A data bus BS transfers signals between rotation detecting portion 300, speed control portion 400, position control portion 500 and tuning portion 600.

Turning again to FIG. 2, if the inertia J of the motor is oblique, switch 502 is connected to contact k2, whereby a known test signal is supplied to the position control means 505, and a signal which is thereby outputted by position control portion 500, is monitored by an output terminal of the motor. The inertia value which has been set is then adjusted by operation of the inertia setting switch, for the purpose of cancelling the distortion of the monitored waveform.

Fn and J may be set by an exterior controller as an alternative to the above described switches.

In the FIG. 2 embodiment, although the control parameter is read out from gain table 506 when both characteristic frequency fn and inertia J are set by operation of the servo tuning switch, the control parameter may also be read out when either one of fn or J is set.

The illustrative embodiment of FIG. 2 has many advantages, such as the following.

1. In the motor, from portion 100, since torque is generated from the magnetic fields of the exciting coil of the stator and the static magnet, the ratio between torque and motor weight (abbreviated "torque/weight") can be enlarged. Furthermore, the static magnet, the size of which needs to be enlarged to a certain size to obtain the necessary surface flux density, is disposed on the stator side. Thus, the weight of the rotor can be reduced. As a result, torque/weight can be enlarged.

2. In driving circuit 200, since a current detecting circuit, including a small signal isolator, is used as the current detecting means, i.e. detecting means for feedback signals, for the motor coil, the exciting current can be detected at high accuracy and in a highly insulated manner, whereby the motor can be rotated with only small speed ripples.

3. In the rotation detecting portion 300, since the slits for detecting positions are arranged in two concentric circles, and the difference of the number of slits in the two circles are arranged to be the same as the number of teeth on the motor, the phase difference between the teeth of the stator and those of the rotor can be directly obtained by making sue of the phase difference between the waveformed signals of the penetrated light through the slits. As a result, the rotational position and rotational speed of the motor can be detected with high resolution.

Furthermore, the encoder includes the original point detecting slits in addition to position detecting slits. The signals from the encoder I/F $300_2$ are supplied to speed control portion 400 and position detecting portion 500. As a result, the rotation detecting portion 300 has all of the following functions: speed detecting, position detecting, original point detecting and magnetic pole detecting.

4. In servo tuning portion 600, when fn and J are set by operation of the servo tuning switch, the most suitable parameter value is read out from the gain table. The rotation of the motor is controlled by means of the thus obtained parameter value. As a result, the user does not need to set each control parameter value, such as adjusting the gain of the circuit, whereby the servo system can be easily adjusted. Moreover, only by setting fn and J, the gain setting of MDA 404, which is tertiary controlled, can be easily performed in a quadratic manner.

Figure 13:
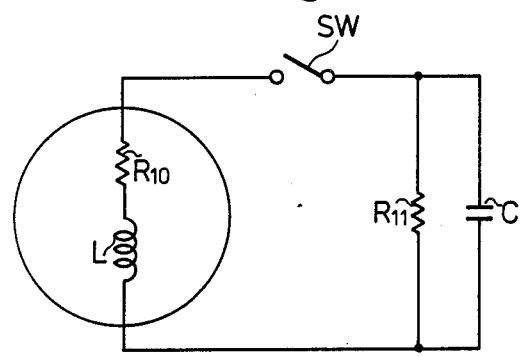
FIGS. 13 and 14 schematic views depicting equivalent circuit diagrams control portion depicted in FIG. 12.
Figure 14:
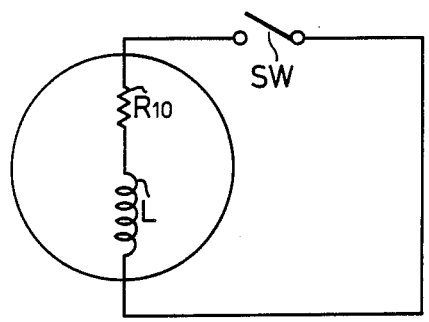

5. In servo tuning portion 600, if the load inertia of the motor is oblique, a known test signal is supplied to position control means 505 to take the relevant output from the position control portion through the monitor output terminal 606, whereby the output is monitored. As a result, the inertia value, which has been set, is adjusted by operation of switch 602 so as to prevent deflection of the monitored waveform. As a result, even if the load inertia of the motor is oblique, the servo system can be easily adjusted Turning now to FIG. 12, which depicts another illustrative embodiment of the invention, a stopper portion 700 is placed between motor portion 100 and driving circuit 200. Stopper portion 700 serves to stop motor 100 by stopping the generation of electrical energy. When the motor is rotated at a high speed, that is, when the rotational speed of the motor exceeds a predetermined reference value, a coil L of the motor is, as shown in FIG. 13, connected to a parallel circuit comprising a resistor $R_{11}$ and a capacitor C. On the other hand, when the motor rotates at a low speed, that is, when the rotational speed of the motor is lower than a predetermined reference value, the coil of the motor is, as shown in FIG. 14, shorted. Symbol $R_{10}$ represents the coil resistance of coil L. Coil L corresponds to coils $L_1$ and $L_2$ shown in FIG. 2.

A series resonance is generated between capacitor C and coil L by connecting the circuit shown in FIG. 13 whereby phase $\phi$ is prevented from becoming large. As a result, consumption of kinetic energy of the motor is increased. Furthermore, in order to decrease the value Q in the resonance, resistor $R_{11}$ is connected in parallel to capacitor C. as a result, the kinetic energy is further consumed.

Referring again to FIG. 12, the embodiment comprises an electrical energy generation stopper circuit 710 and a circuit 720 for controlling the stoppage of generation of electrical energy for controlling circuit 710. Circuit 710 comprises a rotation/stop switch SW10 connected to a contact al when the motor is rotated and to contact a2 when the motor is stopped. Stoppage method selection switch SW11 is connected to contact $b_1$ to perform stoppage by means of a parallel circuit, which is a resonance circuit, comprising resistor $R_{11}$ and capacitor C. On the other hand, when switch SW11 is connected to contact $b_2$, the stoppage is performed by shorting the motor coil L.

Circuit 720 comprises an AND gate 721 which has one input terminal thereof to which is applied a control signal BR and another input terminal to which is applied a high level signal. A relay 722 switches switch SW 10 in accordance with an output from AND gate 721.

A voltage generating means 723 generates voltage in response to a speed signal V from the motor. A comparator 724 compares an output voltage from voltage generating means 723 with a reference voltage $V_R$, and generating a binary signal corresponding to the compared result. An AND gate 725 generates an AND signal from an output from comparator 724 and control signal BR. A relay 726 switches the switch SW 11 in accordance with an output from AND gate 725.

A comparison means corresponds to comparator 724. A stoppage switch means corresponds to a circuit comprising AND gate 721 and AND gate 725, relays 722 and 726, and switch SW 11.

Figure 12:
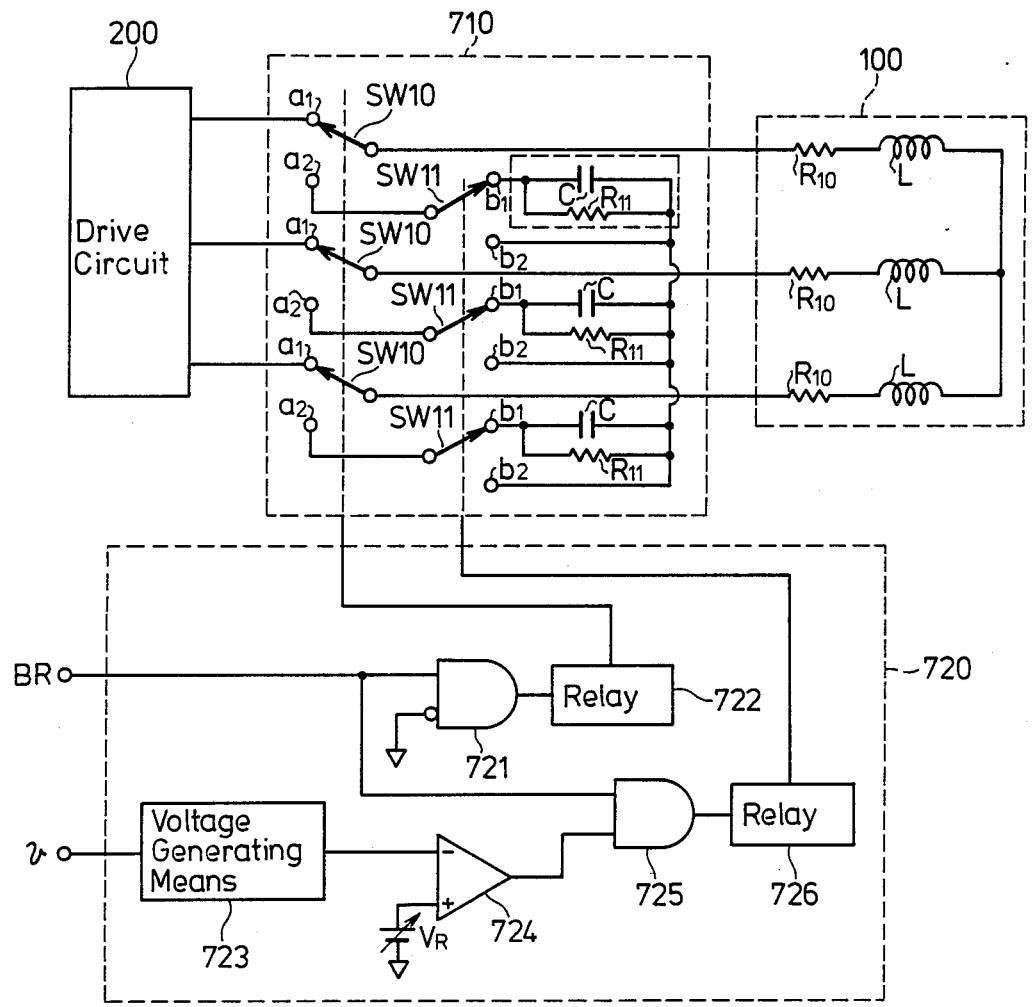
FIG. 12 is a schematic view depicting the structure of another illustrative embodiment of the invention.

Operation of the stopper portion of FIG. 12 is as follows. When the motor having the stopper portion of FIG. 12 is rotated, stopper signal BR is set to a low level. As a result, an output from AND gate 721 becomes a low level, whereby relay 722 makes switch SW 10 connect to contact $a_1$. As a result, an exciting current is supplied from driving circuit 200 to motor 100.

When the motor is stopped, stopper signal BR is set to a high level. As a result, an output from AND gate 721 becomes a high level, whereby relay 722 makes switch SW 10 connect to contact $a_2$.

In this case, when the rotational speed $\overline{V}$ of the motor exceeds a predetermined reference value, relay 726 makes switch SW 11 connect to contact $b_1$ in response to an output from comparator 724.

As a result, a resonance circuit, comprising a parallel circuit formed by resistor $R_{11}$ and capacitor C, is connected to motor coil L. In this resonance circuit, the kinetic energy of the motor is consumed. Provided that the phase $\phi$ is $\phi''$, it is expressed by the following equation.

$$\rho'' = \tan^{-1} \frac{\omega L - \frac{\omega C R_{11}}{1 + (\omega C R_{11})^2}}{R_{10} + \frac{R_{11}}{1 + (\omega C R_{11})^2}} \quad (5)$$

wherein $\omega = Nr \cdot \dot{\theta}$; $\omega$ is circular frequency of induction of voltage of coil; Nr is a constant; and $\dot{\theta}$ is the rotational speed of the motor. The reference numerals in equation (5) represent resistance, inductance, and static capacitance.

Figure 15A:
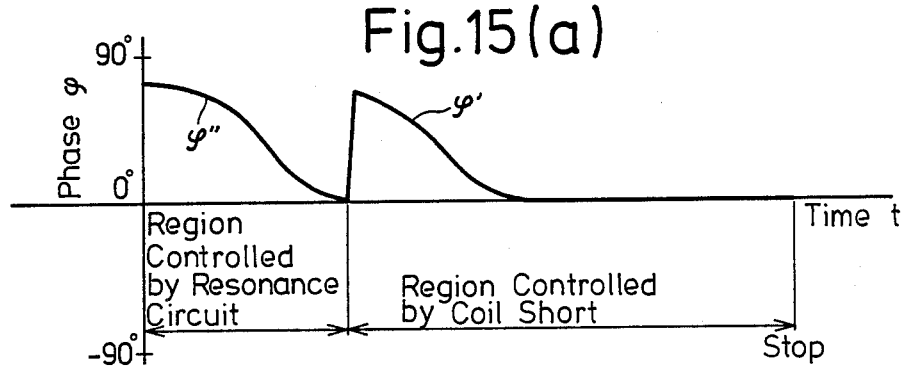
FIGS. 15(A) and 15(B) are graphs depicting the characteristics of the stopper portion.

As shown in FIG. 15(A), phase $\phi''$ experiences aging. The rotational speed $\dot{\theta}$ of the motor is supplied as a signal $\overline{V}$ to electrical energy stoppage control circuit 720.

When rotational speed $\overline{V}$ of the motor is lower than a predetermined reference value, relay 726 makes switch SW 11 connect to contact $b_2$ in accordance with the output from comparator 724.

As a result, the motor coil is shorted, and the kinetic energy of the motor is, as in a similar manner as the circuit of FIG. 13, consumed. Provided that the phase $\phi$ is $\phi'$ in this state, 'is expressed as follows.

$$\rho' = \tan^{-1} \frac{(\omega L)}{R_{10}} \quad (6)$$

Figure 15B:
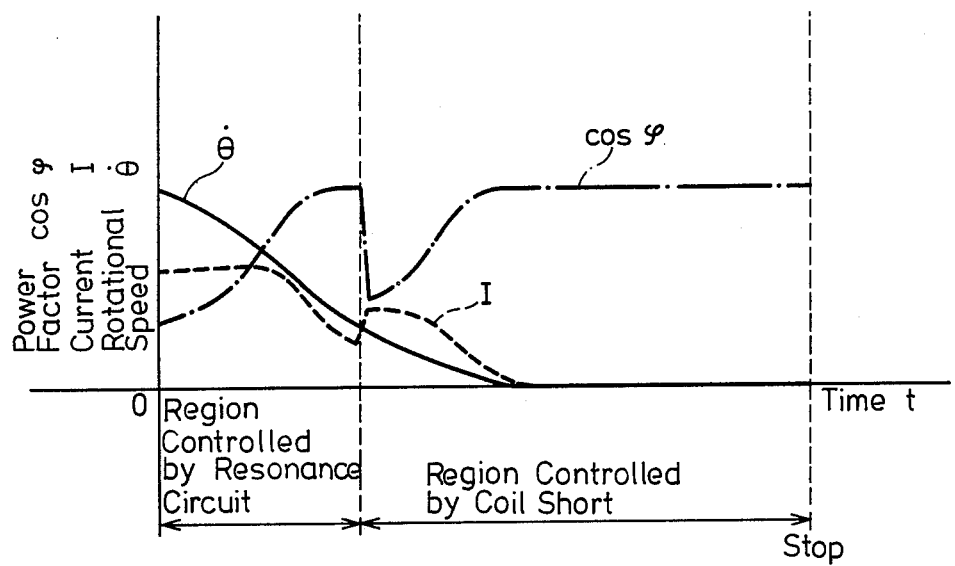

The phase $\phi'$ experiences aging as shown in FIG. 15(A). The agings experience by the rotational speed $\theta$ of the motor, exciting current I of the coil, and power factor cos are as shown in FIG. 15(B).

In the stopper portion of FIG. 12, when the rotational speed of the motor is low, the phase $\phi$ is expressed by equation (6). On theother hand, when the rotational speed is high, the phase $\phi$ is expressed by equation (5).

Energy P consumed in these circuits is given by the following.

$$P = V \cdot I \cdot \cos \phi \quad (7)$$

Therefore, P becomes a maximum value when $\cos \phi = 1$.

As can be seen from the curve of $\cos \phi$ shown in FIG. 3(B) and equation (7), when the rotational speed of the motor is high, $\cos \omega''$ approximates 1 faster than $\cos \phi'$. Therefore, a method of stopping electric energy generation using series resonance between a capacitor and a motor can consume kinetic energy of the motor faster.

When the rotational speed of the motor is low, the circuit shown in FIG. 14 exhibits better efficiency. Thus, when the rotational speed is lower than a certain level, the stoppage characteristic equivalent to a mechanical brake can be obtained by a simple structure which involves switching the circuit of FIG. 13 to that of FIG. 14.

In the stopper portion, since the motor is stopped by selecting, in accordance with the rotational speed of the motor, either of shorting of the motor coil or connecting the RC resonance circuit with the motor coil, the motor can be effectively stopped through a wide range of rotational speeds.

Figure 16:
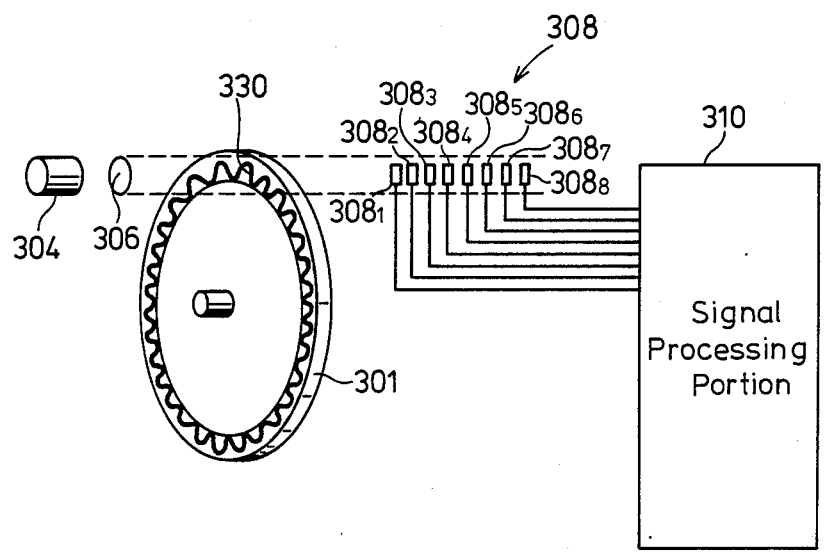
FIG. 16 is a schematic view depicting another example of the structure of the slits used in the rotation detecting portion of FIGS. 8, 9, 10.
Figure 17:
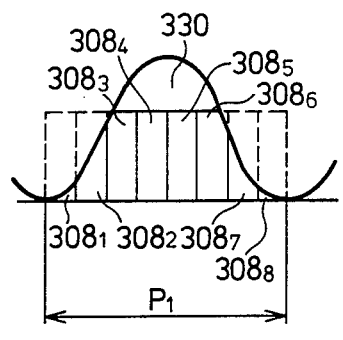
FIGS. 17 and 18 are diagrams depicting the structure of the slits shown in FIG. 16.

Turning now to FIG. 16, which depicts the rotational detecting portion using an encoder having slits in the shape of a sine wave, a plurality of light penetrating slits 330 in the shape of a sine wave are disposed in the circumferential direction of a code plate 301 at a predetermined pitch. Photodiodes $308_1$ to $308_8$ are, as shown in FIG. 17, disposed at a pitch $P_L$ which is the same as that of the light penetrating slits 330. Although slits 330 are disposed in the circumferential direction, they are shown in FIG. 17 in a developed manner for the sake of convenience of explanation.

Figure 18:
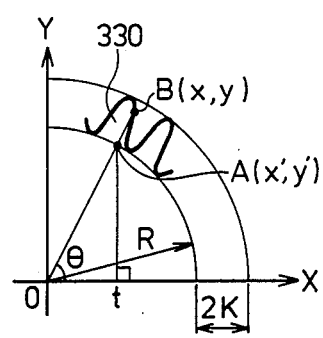

The shape of the light penetrating slits 330 will now be described with reference to FIG. 8 which shows the shapes of the slits 330, and wherein symbol O represents a rotational center of code plate 301, symbols X and Y, each of represents a rectangular coordinate axis with point O as the origin. The symbols of FIG. 18 are N is the number of slits per round; R is the radius of a circle in the slit configuration; 2K is the difference between the radii of circles inside and outside of the slit configuration; A is the points on the inside circumference of the slits; B is the intersections between extensions of segments AO and the sine waveformed portions; $\theta$ is the angle determined by segments AO and X coordinate; t is the X coordinate of point A; (x,y) is the coordinate of point B; (x',y') is the coordinate of point A.

Consider $0 \leq \theta \leq \pi/2$; and $\overline{AB} = K(1 + \text{sine } N\theta)$; and $$\theta = \tan^{-1} \frac{y}{x} = \tan^{-1} \frac{\sqrt{R^2 - t^2}}{t}.$$

Therefore, x and y are expressed as follows.

$$x = t + k\left(1 + \sin\left(N\tan^{-1}\frac{\sqrt{R^2 - t^2}}{t}\right)\right)\cos\left(\tan^{-1}\frac{\sqrt{R^2 - t^2}}{t}\right)$$

$$y = \sqrt{R^2 - t^2} +$$

-continued $$k\left(1 + \sin\left(N\tan^{-1}\frac{\sqrt{R^2-t^2}}{t}\right)\right)\sin\left(\tan^{-1}\frac{\sqrt{R^2-t^2}}{t}\right)$$

wherein $x' = t$; and $$y' = \sqrt{R^2 - t^2}$$

The region surrounded by the locuses of points A and B is the light penetrating slit.

This can meet the region of $\pi/2 \leq \theta \leq 2$.

FIG. 19 depicts another example of a rotation detecting portion comprising an encoder in which two sets of position detecting light penetrating slits are used with the slits being formed in the shape of a sine wave.

The outer slit configuration comprises $m_1$ light penetrating slits 331, while the inner slit configuration comprises $m_2$ light penetrating slits 332, with $m_1 - m_2$ being arranged to be the same as the number of teeth of the motor portion 100.

Slit configurations 331 and 332 are provided for detecting the setting of the teeth of the rotor and of the teeth of the stator.

Shift registers SR1 and SR2 turn ON and OFF in sequence switches $SW_1$ to $SW_8$ to obtain at a certain timing the outputs from photodiodes $308_1$ to $308_8$ and $309_1$ to $309_8$.

Operation of the FIG. 19 circuit is as follows. The scanning frequency of switches SW1 to SW8 is set at 8fs, wherein fs represents the frequency of the waveforms of the outputs from LPF 313 and LPF 314. Light beam, which has passed through outer slits 331, is detected by diode array 308, while light beam, which has passed through slits 332, is detected by diode array 309. By scanning the detection signals from the diode arrays with frequency 8fs, signals $f_1(t)$ and $f_2(t)$ which have passed LPF 313 and LPF 314 are as follows.

$$f_1(t) = A_1 \sin(\omega t + M_1 \theta) \quad (8)$$

$$f_2(t) = A_2 \sin(\omega t + M_2 \theta) \quad (9)$$

wherein $A_1$ and $A_2$ are constants; $\theta$ is the rotational angle of the code plate and $\omega$ is $2\pi f_s$. The phase difference between two signals is $$\phi = (M_1 - M_2)\theta \quad (10)$$

The relationship between phase difference $\phi$ and the rotational angle $\theta$ of the code plate will now be described. Consider that the number of outer slits $M_1$ is eight and the number of inner slits $M_2$ is six; and the number M of teeth of the motor is set at two since $8 - 6 = 2$. The relationship between the detection signals from the photodiode arrays 308 and 309 and the rotational angle of the motor can be expressed as shown in FIG. 20, lines (A) and (B). As can be clearly seen from these wave charts, the shift between the detection signals, i.e. electrical angles, increases as $\phi_1, \phi_2, \ldots$, in proportion to the increase in the actual rotational angle $\theta$, i.e. the mechanical angle, of code plate 301.

The shift $\phi$ between two detection signals when the code plate is rotated by $\theta$ can be expressed as follows from equation (10).

$$\phi = (8-6)\theta$$

On the other hand, the rotor of the motor also rotates by $\theta$ as code plate 301 rotates by $\theta$. Since the number of teeth of the motor is two, the teeth of the rotor of the motor and the teeth of the stator of the motor shift by angle $2\theta$. That is, the phase difference detected by the code plate corresponds to the shift of the electrical angle between the teeth of the rotor and the teeth of the stator. Depending upon this relationship, the positional relationship between the teeth of the rotor and the teeth of the stator is detected, and commutation of the motor is thereby controlled.

In the encoder of FIG. 19, since each slit is formed in the shape of a sine wave, light which reaches each photodiode forms a sine wave. Since each photodiode generates an output corresponding to the area irradiated with light, the detection signal form the encoder is formed, as shown in FIG. 21, in a sine wave form which approximates the form of the reference wave in accordance with the arrangement of photodiodes $308_1$ to $308_8$. As a result, a detection signal is obtained of the displacement converter which exhibits high accuracy without any high frequency components.

The FIG. 19 encoder is helpful in making the motor rotate smooth ly when it is applied to controlling the rotational speed of the motor.

FIGS. 22(A) and 22(B) depict another example of a rotation detecting portion comprising a magnetic resolver, wherein FIG. 22(A) is a frontelevational view of the device and FIG. 22(B) is a cross-sectional view taken along line Z—Z of FIG. 22(A). The embodiment comprises a stator 810 wherein non-magnetic materials 814, 815 are respectively interposed between the three magnetic parts, that is, between 811 and 812, and between 812 and 813. Each of the magnetic parts 811, 812, and 813 has three salient poles $811_1$ to $811_3$, $812_1$ to $812_3$ and $813_1$ to $813_3$. Teeth 816 are formed at each top end of the salient poles.

The teeth of the salient poles on one magnetic part are disposed in the same phase, while the teeth on the mangetic parts 811, 812 and 813 are shifted with respect to each other by $((\frac{1}{3}) + m_a)p_a$ wherein $p_a$ represents the teeth pitch, and m represents an integer. A coil $817_1$ to $817_3$, $818_1$ to $818_3$, and $819_1$ to $819_3$ is wound around each magnetic part 811, 812 and 813, as depicted.

The embodiment further comprises a rotor 820 which is made of a magnetic material, and which is disposed radially further outward than stator 810. Teeth 821, which oppose teeth 816, and which have substantially the same pitch as those of the teeth 816, are formed on rotor 820.

A three phase oscillator 822 applies sine wave voltages Vo $\sin \omega t$, Vo $\sin(\omega t + 120°)$ and Vo $\sin(\omega t - 120°)$ to coils $817_1$ to $817_3$, $818_1$ to $818_3$ and $819_1$ to $819_3$, respectively.

An arithmetic means 823 calculates the rotational angle and the rotational speed of rotor 810 by making use of currents passed through coils $817_1$ to $817_3$, $818_1$ to $818_3$, and $819_1$ to $819_3$. Each current, which passes through each coil, is detected by connecting each resistor in series manner to each coil, and measuring the voltages at two ends of the relevant resistor.

When a three phase coil is used, the number of salient poles is not limited to 9. As an alternative, it may be $3n_a$, wherein $n_a$ represents the number of salient poles per stator.

Turning to FIG. 23, a circuit diagram of the above device, comprises oscillators $822_1, 822_2$ and $822_3$ for applying sine wave voltages Vo sinωt, Vo sin (ωt+120°) and Vo sin (ωt−120°) to coils $817_1$ to $817_3$, $818_1$ to $818_3$ and $819_1$ to $819_3$, respectively. A signal source corresponds to oscillators $822_1$ to $822_3$.

Operation of the device is as follows. Inductances $L_{17}$, $L_{18}$ and $L_{19}$ of the correspondig coils $817_1$ to $817_3$, $818_1$ to $818_3$, and $819_1$ to $819_3$ are determined by means of each magnetic resistance $R_{17}$, $R_{18}$ and $R_{19}$ of the coils. Thus, the inductances are expressed as follows.

$$\left.\begin{aligned} L_{17} &= n^2/R_{17} \\ &= n^2/(Ro + r_o\sin\theta) \\ L_{18} &= n^2/R_{18} \\ &= n^2/(Ro + r_o\sin(\theta + 120°)) \\ L_{19} &= n^2/R_{19} \\ &= n^2/(Ro + r_o\sin(\theta - 120°)) \end{aligned}\right\} \quad (11)$$

wherein Ro, $r_o$ are magnetic resistances and n is the number of turns. of the coils.

When each coil is excited by three phase oscillator 822, currents $I_{17}$, $I_{18}$ and $I_{19}$, which pass through the corresponding coils $817_1$ to $817_3$, $818_1$ to $818_3$, and $819_1$ to $819_3$ are expressed as follows.

$$\left.\begin{aligned} I_{17} &= \frac{Vo\sin\omega t}{\omega L_{17}} \\ &= \frac{Vo\sin\omega t}{\omega} \cdot \frac{1}{n^2}(Ro + ro\sin\theta) \\ &= (a + b\sin\theta)\sin\omega t \\ I_{18} &= (a + b\sin(\theta + 120°))\sin(\omega t + 120°) \\ I_{19} &= (a + b\sin(\theta - 120°))\sin(\omega t - 120°) \end{aligned}\right\} \quad (12)$$

wherein a and b are constants. Then, the sum of currents $I_{17}$, $I_{18}$ and $I_{19}$ is calculated and expressed as follows.

$$\begin{aligned} I &= I_{17} + I_{18} + I_{19} \quad (13) \\ &= a(\sin\omega t + \sin(\omega t + 120°) + \sin(\omega t - 120°)) + \\ &\quad b(\sin\theta \sin\omega t + \sin(\theta + 120°)\sin(\omega t + 120°) + \\ &\quad \sin(\theta - 120°)\sin(\omega t - 120°)) \\ &= \frac{b}{2}(\cos(\theta - \omega t) - \cos(\theta + \omega t) + \cos(\theta - \omega t) - \\ &\quad \cos(\theta + \omega t + 240°) + \cos(\omega t - \theta) - \\ &\quad \cos(\theta + \omega t - 240° \text{ C.})) \\ &= \frac{3}{3} b \cos(\theta - \omega t) \end{aligned}$$

Since equation (13) is the same as the equation of the output signal of the resolver, the phase of which is converted at rotational angle $\theta$, the R/D converter becomes unnecessary. Furthermore, the above optical encoder and an interface of the signal become the same. Thus, a common control circuit may be used.

From equation (13), rotational angle $\theta$ is obtained. Also, since $\theta = Vo \, t$, wherein Vo represents the angular velocity of the rotation of the rotor, the rotational speed of the rotor is calculated by making use of the frequency of $\theta$.

FIG. 24 depicts a counter circuit, using position and speed detecting devices, comprising a position and speed detecting device 830; a wave shaping means 831 for shaping the wave form of an output from the position and speed detecting device 830; a counter 832 for counting the period of the shaped signal; and a microprocessor 833 for obtaining rotational angle $\theta$ using the counted number of the period counter 832 as data.

Provided that the frequency of the output signal from the position and speed detecting device 830, when the rotor is stopped, is 3 KHz and the frequency counted by the period counter 832 is 3 MHz, the microprocessor 833 calculates rotational angle $\theta$ from the following.

$$\theta + \Sigma(\text{data} - 1000)$$

wherein the data is the value counted by period counter 832.

The coil wound around the salient pole is not limited to a three phase coil. It may be a $k_a$-phase coil wherein $k_a$ represents an integer. In this case, the number of salient poles is arranged to be $K_a n_a$.

Although in the embodiment, the phases of the teeth of the adjacent salient poles of the stator are shifted by $P_a/3$ with respect to each other, the rotor may be formed in three layers or the phases of the teeth in the adjacent layers may be shifted by $P_a/3$.

Also, although the coil is driven by voltage and the rotational angle is obtained from the current passing through the coil, the coil may also be driven by a current so that the rotational angle may be detected from the voltage applied to the coil.

By making use of the rotation detection portion, errors due to the eccentricity of the rotor can be eliminated because the rotational angle is calculated from the sum of the signals detected by the plurality of coils disposed in the circumferential direction of the rotor. Furthermore, since no electric circuit is provided inside of the rotation detecting portion, good heat resistance can be obtained. Also, the structure of the detecting portion is arranged to be the same as that of the motor, assembly and adjustment of the detecting portion can be conducted easily.

FIGS. 25(A) and 25(B) depict a rotation detecting portion using a magnetic resolver, wherein FIG. 25(A) is a front elevational view, and FIG. 25(B) is a cross-sectional view taken along line $Z_1-Z_1$ of FIG. 25(A). The detecting portion comprises two annular stator members 901 and 902 made of a magnetic material. Each stator member 901 and 902 has salient poles $903_1$ to $903_4$ and $904_1$ to $904_4$ at a rotational angular interval of 90°. Each front end of the salient pole is provided with teeth 905 at pitch of $P_b$.

The neighboring teeth on one stator member are shifted with respect to each other by $(\frac{1}{2})P_b$. For example, the phases of the teeth of the salient pole $903_1$ and those of salient pole $903_2$ are shifted by $(\frac{1}{2})P_b$.

A stator 907 is formed by the stator members 901 and 902 and a non-magnetic material member 906 is interposed therebetween with the members being stacked as shown. In this case, they are stacked in such a manner that the phass of the teeth of the neighboring salient poles are shifted by $(\frac{1}{4}P_b$. For example, the phases of the teeth of salient pole $903_1$ and those of salient pole $904_1$ are shifted with respect to each other by $(\frac{1}{4})P_b$.

A coil $908_1$ is wound around salient poles $903_1$ and $903_3$; and a coil $908_2$ is wound around salient poles $903_2$ and $903_4$. Coils $908_1$ and $908_2$ form a single phase of a coil. In a similar manner, stator member 902 is wound with coils $909_1$ and $909_2$. A rotor 910 is disposed outside of stators 901 and 902. Rotor 910 has teeth 911 which oppose teeth 905, and which have the same pitch as that of teeth 905.

A signal source 905 supplies alternating voltage signals or alternating current signals to the different phase coils 908 and 909. The alternating current signals supplied to coils 908 and 909 are shifted in phase by 90° with respect to each other.

An arithmetic portion 913 detects, adds and subtracts the voltages or currents between two ends of coils 908 and 909, whereby the rotational position of rotor 910 is calculated from the phase of the added or subtracted signal, while the rotational speed is calculated from the frequency.

To detect the current or voltage at the two ends of the coil, the circuit depicted in FIG. 26, 27 or 28 may be used. The circuit shown in FIG. 26 is characterized in that voltages at two ends of the coils are detected. The circuit shown in FIG. 27 detects current at the two ends. The circuit of FIG. 28 comprises a transformer for detecting the signals.

Operation of the rotation detecting portion is as follows. A power source 912 applies alternating voltage $V_1 \cos(\omega t + \Delta_A)$ to coils $908_1$ to $908_2$, while source 912 applies alternating voltage $V_1 \cos(\omega t + \Delta_B + 90°)$ to coils $909_1$ and $909_2$, wherein $V_1$ represents amplitude of voltage, $\Delta_A$ and $\Delta_B$ represent errors in the electrical angles.

When rotor 910 rotates by angle $\theta$, each voltage $V_{S1}$, $V_{S2}$, and $V_{C1}$, $V_{C2}$ at the two ends of each coil $908_1$, $908_2$ and $909_1$, $909_2$ is expressed as follows.

$$V_{S1} = V_1 (1 + m_b \sin(\theta + \delta_A)) \cos(\omega t + \Delta_A) \quad (14)$$

$$V_{S2} = V_1 (1 - m_b \sin(\theta + \delta_A)) \cos(\omega t + \Delta_A) \quad (15)$$

$$V_{C1} = V_1 (1 + m_b \cos(\theta + \delta_B)) \sin(\omega t + \Delta_B) \quad (16)$$

$$V_{C2} = V_1 (1 - m_b \cos(\theta + \delta_B)) \sin(\omega t + \Delta_B) \quad (17)$$

wherein $m_b$ is a constant; $\delta_A$ and $\delta_B$ are errors of mechanical angles.

Arithmetic portion 913 detects the voltages at two ends, and calculates as equations $14-15+16-17$, whereby the calculated value $V_b$ is obtained as follows.

$$V_b = m_b (\sin(\omega t + \theta + \delta_A + \Delta_A) + \sin(\omega t + \theta + \delta_B + \Delta_B) + 2\sin\left(\frac{\Delta_B - \delta_B - \Delta_A + \delta_A}{2}\right)\cos\left(\omega t + \theta + \frac{\Delta_B - \delta_B + \Delta_A - \delta_A}{2}\right) \quad (18)$$

By adjusting the electrical angle in equation (18) and by setting the following relation $\Delta_B - \delta_B - \Delta_A + \delta_A = 0$, the second term on the right hand side of equation (18) becomes zero, whereby the accuracy of the phase is improved.

The number of salient poles provided on each stator and the number of stator members are not limited to those disclosed herein. In the case where one stator member is provided with $n_b$ salient poles, wherein $n_b$ represents a multiple of 2, while the number of stator members is $k_b$, each value can be expressed as follows.

The shift of phases of teeth on neighboring salient poles in one stator is $P_b/2$; the shift of phases of teeth on neighboring salient poles when the stator members are stacked is $((\frac{1}{2}k_b) + m_b)$ when $K_b$ is 2; and $((1/k_b) m_b)$ when $k_b$ is an integer other than 2; wherein $m_b$ is an integer and $k_b$ is the number of phase of the coil.

The difference of phase between the phases of the alternating voltage or alternating current for driving the coil is $360°/2k_b$, when $K_b$ is 2 and $360°/k_b$ when $k_b$ is an integer other than 2.

In the embodiment, although the structure is described in which the phases of the teeth on neighboring salient poles of the stator are shifted, the rotor may be formed in a stacked manner consisting of $k_b$ layers, and the phases of the teeth of the neighboring layers may be, in a similar manner for the neighboring salient poles in the embodiment, shifted with respect to each other.

According to the rotation detecting portion of the invention, since the difference in voltage or current at two ends of a coil wound around the salient poles whose teeth are shifted by $P_b/2$, is detected, the high frequency of even degree can be cancelled, whereby the rotation of a motor is detected with high accuracy.

Furthermore, since the carrier is cancelled in a differential manner in the calculation for obtaining equation (18), temperature characteristics are improved. Moreover, the number of cores and circuit can be reduced by two thirds with respect to the three phase rotation detecting portion shown in FIG. 22. Also, by making the number of teeth of a motor and those of a resolver the same, the commutation control can be conducted by making use of the phase of the resolver signal. The invention has many advantages as above discussed and is effective for use to drive joints of a multi-jointed robot.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A direct drive motor system comprising
    motor means of an inductor type comprising a rotor, a stator and a coil;
    rotation detecting means for detecting rotation of said stator;
    position control means for obtaining a first difference between an instruction signal of a rotational position of said rotor and a detection signal from said rotation detecting means, and for outputting a control signal depending upon said obtained first difference by using a tertiary servo system;
    speed control means for obtaining a second difference between said output signal from said position control means and said detection signal from said rotation detecting means, and for outputting a control signal depending upon said obtained second difference;
    driving means for detecting an exciting current passing through said coil for obtaining a third difference between a detection signal from said exciting current and said output signal from said speed control means, and for controlling said exciting current depending upon said obtained third difference; and
    tuning means for adjusting said tertiary servo system of said speed control means and said position control means.

2. The system of claim 1, wherein said rotor is disposed in an outer portion of said motor means and said stator is disposed in an inner portion thereof.

3. The system of claim 1, wherein said motor means comprises a three phase motor.

4. The system of claim 1, wherein said rotation detecting means comprises means for outputting a position detection signal during rotation to said position control means, and means for outputting a speed detection signal during rotation to said speed detecting means.

5. The system of claim 1, wherein said motor means are provided with a number of teeth; and wherein said rotation detecting means comprises an optical rotary encoder; a code plate fitted to said rotor; slits disposed in said code plate, said slits comprising first slits used to detect an original point and disposed at a predetermined pitch in a circumferential direction of said code plate, and second slits used to detect rotational position, and disposed at two concentric diameters at a predetermined pitch with difference between number of slits located at a greater radius and number of slits located at a lesser radius being the same as number of teeth of said motor means 6. The system of claim 5, wherein said second slits are formed in the shape of a sine wave.

7. The system of claim 1, wherein said rotation detecting means comprises
   a stator comprising $K_a n_a$ salient poles wherein $K_a$ represents number of layers of said stator and $n_a$ represents number of salient poles per layer, said salient poles each having a top end formed with teeth at a predetermined pitch, the phases of said teeth being shifted by $((1/K_a)+m_a)P_a$, wherein ma represents an integer and $P_a$ represents the pitch of said teeth, in accordance with arrangement order of said salient poles;
   a rotor comprising teeth formed at substantially the same pitch as that of said teeth of said stator, and disposed to be opposite said teeth of said stator;
   a $K_a$ phase coil wound around said salient poles, one phase of said $K_a$ phase coil being formed by a coil wound around salient poles having teeth of the same phase;
   a signal source means for supplying $K_a$ phase alternating voltages or $K_a$ phase alternating currents, the phases of said voltages or currents being shifted by $(360/K_a)°$ to coils in each phase; and
   an arithmetic means for detecting and for adding said currents or voltages applied to said coils in each phase, and for obtaining rotational position from a phase of an added signal, and for obtaining from frequency of said detected currents or voltages rotational speed of said rotor.

8. The system of claim 1, wherein said rotation detecting means comprising
   first stator members each comprising $n_b$ salient poles having teeth at a predetermined pitch at front ends thereof, wherein $n_b$ is a multiple of 2, and the phases of said teeth on neighboring salient poles are shifted by $P_b$ wherein $P_b$ represents the pitch of said teeth, or coils of Kb phase cil means are wound around neighboring salient poles so that synthesized phases of change in reluctances is shifted by $P_b/2$ between the neighboring salient poles;
   a stator comprising $K_b$ second stator members stacked against each other with the phases of said teeth of neighboring salient bpoles being shifted with respect to each other by $((\frac{1}{2}K_b)+m_b)P_b$, when Kb is 2, and $((1/K_b)+m_b)P_b$, when kb is an integer other than two and wherein $m_b$ represents an integer;
   a rotor having teeth disposed opposite said teeth of said stator at the same pitch as that of said teeth of said stator;
   said $K_b$ phase coil means comprising two sets of coils the phases of which are shifted by $P_b/2$, one set of said coils being formed by a coil around the same phase teeth of one first stator member;
   a signal source means for supplying alternating voltages or alternating currents of which phases are shifted by $360°/2K_b$ when $K_b$ is 2 and $360°/K_b$ when $K_b$ is an integer other than two, to each phase coil; and
   arithmetic means for detecting, for adding, and for subtracting the currents or voltages at two ends of each phase coil, and for calculating rotational position of said rotor of said rotor detecting means from the phase of said adding and subtracting signals and for calculating rotational speed from frequency of said currents or voltages.

9. The system of claim 1, wherein said position control means comprises a gain table, said gain table comprising characteristic freqency of said motor means, load inertia value of said motor means, and most suitable parameter value corresponding to said characteristic frequency and said load inertia.

10. The system of claim 9, wherein said tuning means comprises a characteristic frequency switch, means for setting said characteristic frequency and load inertia in a plurality of steps within a predetermined range to control rotation of said motor means, and means for reading out said most suitable control parameter value from said gain table depending upon at least either one of said characteristic frequency and said load inertia set by said means for setting; and a load inertia setting switch.

11. The system of claim 1, wherein said position control means comprises a gain table, said gain table comprising load inertia value applied to said motor means and most suitable control parameter value corresponding to said load inertia value; and test signal generating means for generating a known test signal as a position instruction signal.

12. The system of claim 11, wherein said tuning means comprises an inertia setting switch for setting an inertia value within a predetermined range in a predetermined plurality of steps to control rotation of said motor means, and means for reading out a most suitable control parameter value from said gain table at said set inertia value; a monitor output terminal; and means for applying said test signals to said position control means, said position control means outputting a control signal when said test signal is applied.

13. The system of claim 1, wherein said speed control means comprises a digital to analog converter, means for applying to said converter a difference signal between a control signal from said position control means and a detectionsignal from said rotation detecting means; and means for setting gain of said converter by means of said signal from said tuning means 14. The system of claim 1, wherein said driving circuit means comprises
   a circuit for detecting an exciting current of said coil;
   a transformer comprising primary and secondary coils, a third coil disposed between said primary coil and said secondary coil, a pulse generator connected to said third coil, primary and secondary circuits, first and second non-linear circuits comprising non-linear elmments connected in parallel in an inverse pole manner, said non-linear elements having non-linear voltage current characteristics which allow current to flow when a voltage exceeding a predetermined palue passes through terminals thereof, each of said primary and secondary circuits comprising averaging means, and a resistor;

wherein said primary coil, said first non-linear circuit and said resistor form a circuit loop for an input circuit; and said secondary coil, said second non-linear circuit and said averaging means form a circuit loop for an output circuit; and wherein said resistor provided in said primary circuit is connected to said coil of said motor, whereby voltage equivalent to voltage at two ends of said resistor of said primary coil is generated at two ends of said averaging means of said secondary circuit.

15. A direct drive moto system comprising motor means of an inductive type comprising a stator, a rotor and a coil;

rotation detecting means for detecting rotation of said rotor;

position control means for obtaining a first difference between an instruction signal of a rotational position of said rotor and a detection signal from said rotation detecting means and for outputting a control signal using a tertiary servo system relative to said first difference;

speed control means for obtaining a second difference between an output signal from said position control means and a detection signal from said rotation detecting means and for outputting a control signal using said second difference;

driving circuit means for detecting an exciting current which passes through said coil, and for obtaining a third difference between a detection signal of said exciting current and an output signal from said speed control means, and for controlling said exciting current by using said third difference;

tuning means for adjusting said tertiary servo system and said position control means; and stopper means for stopping said motor means, said stopper means comprising comparison means for comparing rotational speed of said motor means with a reference value, and for outputting a signal corresponding to said comparison, connection switch means, means,responsive to an output from said comparison means, for shorting said coil of said motor means when rotational speed of said motor means is lower than said reference value, and means, responsive to said output from said comparison means, for connecting said coil of said motor means to a parallel circuit comprising a resistor and a capacitor when rotational speed of said motor means is higher than said reference value.

16. A direct drive motor system comprising motor means of an inductive type comprising a rotor disposed on an outside thereof, a stator disposed on an inside thereof, and a coil;

rotation detecting means for detecting rotation of said rotor of said motor means, and for outputting a position detection signal and a speed detection signal;

position control means for generating a position control signal, said position control means comprising a gain table for recording characteristic frequency, load inertia value, and most suitable control parameter value corresponding to said characteristic frequency and said inertia value,and test signal generating means for generating a known test signal as a position instruction signal, means for obtaining a first difference between said position instruction signal and said position detection signal, and means comprising tertiary servo system and responsive to said first difference for outputting said position control signal;

speed control means,responsive to a second difference between an output signal from said position control means and said position detection signal,for outputting a control signal, said speed control means comprising a digital to analog converter, and means, responsive to a signal from a tuning means, for setting gain of said digital to analog converter;

driving circuit means for detecting an exciting current passed through said coil of said motor means, said driving circuit means comprising current detecting means, including a small signal isolator, for obtaining a third difference between said etection signal of said exciting current and an output signal from said speed control means and means for controlling said exciting current depending upon said third difference; and said tuning means for tuning said tertiary servo system of said position control means, said tuning means comprising a characteristic frequency setting switch, means for setting in said setting switch characteristic frequency and load inerti in a plurality of steps within a predetermined range, means for controlling said setting switch to read out a most suitable control parameter from said gain table depending on at least one of said set characteristic frequency and load inertia to control the rotation of said motor portion, a load inertia setting switch, and means for obtaining said position control signal output from said position control means when said test signal is applied to said position control means.

* * * * *